(12) United States Patent
Fusama

(10) Patent No.: US 7,468,739 B2
(45) Date of Patent: Dec. 23, 2008

(54) IMAGE DATA CREATING AND STORING DEVICE AND IMAGE DISPLAY DEVICE

(75) Inventor: Masaki Fusama, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 559 days.

(21) Appl. No.: 10/275,145

(22) PCT Filed: May 1, 2001

(86) PCT No.: PCT/JP01/03764

§ 371 (c)(1),
(2), (4) Date: Jan. 21, 2003

(87) PCT Pub. No.: WO01/86957

PCT Pub. Date: Nov. 15, 2001

(65) Prior Publication Data

US 2004/0078298 A1 Apr. 22, 2004

(30) Foreign Application Priority Data

May 2, 2000 (JP) .............................. 2000-133799

(51) Int. Cl.
*H04N 7/18* (2006.01)
*H04N 9/47* (2006.01)
*H04N 5/225* (2006.01)
*H04N 5/232* (2006.01)

(52) U.S. Cl. .................... 348/142; 348/211.2; 348/169
(58) Field of Classification Search ................... 348/51, 348/142, 218.1, 36–37, 211.99, 211.2
See application file for complete search history.

(56) References Cited

U.S. PATENT DOCUMENTS 5,752,113 A 5/1998 Borden (Continued)

FOREIGN PATENT DOCUMENTS

EP 0 720 392 A2 7/1996

(Continued)

OTHER PUBLICATIONS

Supplementary European Search Report for European Patent Application EP 01 92 6089 dated May 4, 2005 from the European Patent Office (7 pages).

(Continued)

*Primary Examiner*—Lin Ye
*Assistant Examiner*—Kelly L Jerabek
(74) *Attorney, Agent, or Firm*—Marshall, Gerstein & Borun LLP

(57) ABSTRACT

Provided is an image display system in which image data of a commercial product as an article (8) is freely selected and given to a purchaser by using two-way communication such as Internet and the article (8) can be observed from a view point desired by the purchaser. In this system, the article (8) is placed on a turn table (16) which rotates around a rotational axis (15), an image is taken by a camera (9) installed on a wrist (19) of a robot (18) of plural axes while keeping camera posture Nv so that an optical axis (21) of the camera (9) passes through an observation point of the article (8), for example, a flower, and image data for respective plural imaging positions are stored in the memory (31). An operator specifies the imaging position continuously so that the image data corresponding to the specified imaging position is read out from the memory (31) and displayed by a display means (28) with a control means.

32 Claims, 17 Drawing Sheets

U.S. PATENT DOCUMENTS

| | | | |
|---|---|---|---|
| 6,304,284 B1 * | 10/2001 | Dunton et al. | 348/36 |
| 6,323,898 B1 * | 11/2001 | Koyanagi et al. | 348/169 |
| 6,556,783 B1 * | 4/2003 | Gelphman | 396/20 |
| 6,714,238 B2 * | 3/2004 | Urisaka et al. | 348/211.99 |
| 7,002,623 B1 * | 2/2006 | Ohyama et al. | 348/225.1 |
| 7,110,593 B2 * | 9/2006 | Katagiri et al. | 382/154 |

FOREIGN PATENT DOCUMENTS

| | | |
|---|---|---|
| EP | 0 734 155 A1 | 9/1996 |
| JP | 05-114660 | 5/1993 |
| JP | 06-110054 | 5/1994 |
| JP | 07-318508 | 12/1995 |
| JP | 08-191648 | 7/1996 |
| JP | 09018750 | 1/1997 |
| JP | 10-023297 | 1/1998 |
| JP | 10-121234 | 4/1998 |
| JP | 11-313304 | 11/1999 |
| WO | WO-99/34332 | 7/1999 |
| WO | WO-99/51027 | 10/1999 |
| WO | WO-00/79797 A1 | 12/2000 |

OTHER PUBLICATIONS

Teodosio et al., "Panoramic Overviews for Navigating Real-World Scenes", Proceedings of First ACM International Conference on Multimedia, Aug. 2-5, 1993, Anaheim, CA, US, New York, NY, US, pp. 359-364.

Szeliski, R., "Video Mosaics for Virtual Environments", The Institute of Electrical Engineers, Stevenage, GB; Mar. 1996, pp. 22-30.

Irani, M., et al., "Efficient Representations of Video Sequences and Their Applications", Signal Processing, Image Communication, Elsevier Science Publishers, Amsterdam, NL, vol. 8, No. 4, May 1996, pp. 327-351.

Notification of Transmittal of Copies of Translation of the International Preliminary Examination Report dated Mar. 28, 2003 from The International Bureau of WIPO.

QuickTime VR—An Image-Based Approach to Virtual Environment Navigation by Computer Graphics Proceedings, Annual Conference Series, 1995 (Los Angeles, Aug. 6-11, 1995), Chenchang Eric Chen ED, pp. 29-38, Computer Graphics Proceedings Aug. 6, 1995).

Supplementary Partial European Search Report by the European Patent Office (Berlin) dated Oct. 14, 2004 for European Patent Application EP 01 92 6089.

International Search Report for International Application No. PCT/JP01/03764 from the Japanese Patent Office dated Jul. 26, 2001.

* cited by examiner

IMAGE DATA CREATING AND STORING DEVICE AND IMAGE DISPLAY DEVICE

TECHNICAL FIELD

The present invention relates to a device for displaying images of outer surfaces or inner surfaces of objects to be imaged, for example, a combination of a table and chairs, automobile, plant, structure such as houses, and outdoor scenery. More particularly, the present invention relates to a novel configuration referred to as an Internet robot.

BACKGROUND ART

Currently, information techniques including personal computers are rapidly infiltrating personal lives. Overseas, all kinds of commercial products including books or antiques are easily purchased via Internet communication. This is very quick and simple, because a purchaser can purchase desired commercial products without taking the trouble to go to stores in town. However, since image information of commercial products being transmitted via Internet is limited and fixed, because they are information created and edited unilaterally by a seller, and the purchaser cannot enjoy commercial products from the viewpoint of the purchaser's desire.

A typical prior art is disclosed in Japanese Laid-Open Patent Application Publication No. Hei. 8-22498. In this prior art, three-dimensional images in a virtual world are pre-created by computer graphics. By utilizing the three-dimensional virtual world, an operator can overlook and approach various institutions and make comparison among the institutions as if the operator were normally purchasing products. In addition, images of displayed articles inside the institutions are offered by playing back video. When the operator finds a desired commercial product, its detailed information can be taken out.

In this prior art, a view point of a camera that takes images of the articles, i.e., an optical axis of the camera is predetermined by the seller, and therefore, the purchaser is incapable of selecting his/her desired view point, and hence cannot see images of back portions of the commercial products. Besides, the purchaser cannot observe the articles as serial images of the entire peripheries of the products. Further, some purchasers have their own scenarios of retrieval of the images of articles and move their eyes along a predetermined direction, so that the images can be played back only serially, although branching is possible. The purchaser needs to pre-construct the scenarios of the images of the articles. The need for imaging by the camera and modeling causes increased time and cost. In the case where the article is commercially available automobile, the purchaser cannot randomly access and select cases of an open state-mode, a half-open state-mode, and a closed state-mode of its door, and hence, cannot select and see the respective states of the articles. Moreover, the purchaser cannot perform operations of zoom up, i.e., getting closer, and zoom down, i.e., getting away, in real time.

DISCLOSURE OF THE INVENTION

An object of the present invention is to provide an image display device in which images of outer surfaces or inner surfaces of articles such as commercial products and images of outdoor scenery can be selected and watched by an operator.

Another object of the present invention is to provide a device and a method for creating suitable image data for storing images of objects to be imaged in a memory.

An image data creating device of the present invention comprises:
a camera for taking an image of an object to be imaged;
a displacing means for changing relative positional relationship between the camera and the object to be imaged;
a displacement detecting means for detecting relative displacement between the camera and the object to be imaged;
a memory for storing data of the image taken by the camera;
a memory control means adapted to store the data of the image taken by the camera in the memory as being associated with each relative positional relationship between the camera and the object to be imaged in taking the image; and
a transmission/reception means capable of transmitting the data of the image to an external image display device.

In accordance with the present invention, the camera is adapted to take an image for each of different relative positional relationships with the object to be imaged. Therefore, the relative positional relationships can be called imaging positions. Then, in the addresses corresponding to the respective relative positional relationships in the memory, the associated image data are stored. Then, the image data is suitably transmitted to the image display device, and the image at the desired imaging position can be observed.

It is preferable that the displacing means includes a first displacing means for displacing the object to be imaged and a second displacing means for displacing the camera, and the device further comprises:
a first displacement detecting means for detecting displacement of the object to be imaged and a second displacement detecting means for detecting displacement of the camera, and
the memory control means is adapted to, in response to outputs of the first displacement detecting means and the second displacement detecting means, define the relative positional relationship based on a combination of the detected displacement of the object to be imaged and the detected displacement of the camera.

This is because when the object to be imaged is a displaceable one, such as an article, various image data of the article or the like is obtainable.

It is preferable that the first displacing means is comprised of a turntable for rotating the object to be imaged around a predetermined rotational axis, the second displacing means is comprised of a robot of plural axes for displacing the camera along the rotational axis, the first displacement detecting means is comprised of a rotational angle detecting means for detecting a rotational angle of the turn table, and the second displacement detecting means is comprised of an axial position detecting means for detecting the axial position of the camera.

This is because functions and effects of the present invention can be provided with a simple configuration. To be specific, in order to create and store the image data of the object to be imaged in the memory, the object to be imaged is set on the turn table, the turn table is rotated around the rotational axis, the camera is installed on the robot of plural axes, and the image data is stored in the memory for each imaging position as the address corresponding to the rotational angle associated with the turn table and the rotational axis position displaced by the robot. The optical axis (angle-line) of the camera may be changed by the robot. When the camera is displaced along the rotational axis, it may be driven to be angularly displaced so that the optical axis (angle-line) of the camera passes through the predetermined portion (or point) of the object to be imaged.

Or, the image data creating device in which the displacing means is comprised of a movable reflecting mirror provided on an optical axis of the camera, in other words, the movable reflecting mirror being adapted to turn around the optical axis of the camera, and reflected light from the object to be imaged is adapted to be reflected on a reflecting plane of the movable reflecting mirror and then be incident on the camera along the optical axis, is suitable for obtaining images of outside scenery or inner peripheral face or the like of a building. The simplified configuration, which is a turnable reflecting mirror, can obtain various images.

The movable reflecting mirror is pivotable around a straight line which passes through a point where the optical axis of the camera crosses the reflecting plane and is perpendicular to the optical axis of the camera. By adding such constitution to the image data creating device, images of substantially all the directions of the scenery or the like around the camera can be obtained.

It is preferable that the image data creating device comprises a turn angle detecting means and a pivot angle detecting means of the movable reflecting mirror, wherein the memory control means is adapted to, in response to outputs of the turn angle detecting means and the pivot angle detecting means, define the relative positional relationship based on a combination of the detected turn angle and the detected pivot angle.

An image display device of the present invention, comprises:

a transmission/reception means capable of receiving image data from an external memory in which the image data for each of plural imaging positions obtained by taking an image at each of the plural imaging positions having different relative positional relationships between an object to be imaged and a camera that takes an image of the object to be imaged is stored as being associated with the each imaging position;

a display means;

a specifying means for specifying the imaging position; and a control means adapted to, in response to an output of the specifying means, read out at least part of the image data at a predetermined imaging position from the external memory and display the part of the image data by the display means, and then adapted to read out image data corresponding to the imaging position specified by the specifying means from the external memory and display the image data by the display means.

In accordance with the present invention, the image data of the object to be imaged for each of plural imaging positions is stored in the memory, and the operator operates the specifying means to specify the imaging position. Thereby, the control means reads out the image data corresponding to the specified imaging position from the memory and visually displays the image data by the display means. Therefore, the operator can freely observe the image of the commercial product or the scenery as the object to be imaged like playing a game by utilizing two-way communication such as Internet communication. Thus, the problems associated with the prior art can be solved.

Also, the present invention is characterized in that plural pieces of image data stored in the external memory are obtained by taking images while keeping a posture of the camera in such a manner that the optical axis of the camera passes through a predetermined portion (or point) of the object to be imaged at the respective imaging positions of the camera.

In accordance with the present invention, the image data stored in the external memory is the image data of the object to be imaged which is imaged by the camera in such a manner that the optical axis of the camera passes through the predetermined portion (observation point) of the object to be imaged, for example, the center of gravity of the object to be imaged. Thus obtained image data is stored in the external memory. Since the object to be imaged is imaged by the camera aiming at the center of gravity of the object to be imaged or a number of the other predetermined observation points than the center of gravity, the images desired by the operator can be obtained. For example, when the object to be imaged is a plant, the predetermined observation point is not a branch but a flower.

The present invention is characterized in that the specifying means is adapted to specify a zoom up/zoom down position which is close to/or away from the object to be imaged as the imaging position of the camera, and the control means is adapted to enlarge/reduce the image data in the external memory with a magnification corresponding to the zoom up/zoom down position and display the image data by the display means.

In accordance with the present invention, the use of the specifying means renders the imaging position of the camera closer to the object to be imaged for zoom up, or away from the object to be imaged for zoom down, and according to the zoom up and zoom down, the image data stored in the external memory is processed so that the operator can see enlarged part as the closer image data that is desired by the operator or a reduced entire image as the further object to be imaged, which can be carried out by operation of the operator in real time.

The present invention is characterized in that the image data stored in the external memory are obtained by taking images of plural kinds of state-modes of the object to be imaged by the camera, the specifying means is adapted to specify one of the state-modes, and the control means is adapted to read out image data in the state-mode specified by the specifying means from the external memory and display the image data by the display means.

In accordance with the present invention, the image data stored in the external memory is image data for each of plural kinds of state-modes of the object to be imaged. For example, when the object to be imaged is automobile, image data of its door in an open state-mode or a closed state-mode is stored in the external memory for each state-mode. The operator can operate the specifying means to select and specify the state-mode, and the image data in a desired state-mode can be displayed by the display means.

The present invention is characterized in that the specifying means is adapted to continuously specify adjacent imaging positions.

In accordance with the present invention, the imaging position of the image data stored in the external memory can be changed into its adjacent one by the operation of the specifying means. This makes it possible that the operator can see the image of the object to be imaged which is displayed by the display means while changing the optical axis continuously. The specifying means may be push buttons configured by displaying four outward arrows, i.e., upward and downward, and rightward and leftward arrows as shown in FIG. 5(1), or a cursor moving in a screen of the display means as shown in FIG. 5(2). In this way, the imaging position of the image data can be continuously changed.

An image display system of the present invention comprises one of the above-mentioned image data creating devices, one of the above-mentioned image display devices, and a network connecting a transmission/reception means of the image data creating device and a transmission/reception means of the image display device so as to enable two-way communication.

In accordance with the image display system, as described above, the operator can obtain all the images of a commercial product or scenery as the object to be imaged as if the operator were playing a game by utilizing two-way communication such as Internet communication.

It should be appreciated that the external image display device in the image data creating device is the prescribed image display device of the present invention, and the external memory in the image display device is the prescribed memory in the image data creating device of the present invention.

A method of displaying an image of the present invention comprises:
   a store step of storing image data for each of plural imaging positions obtained by taking an image at each of the plural imaging positions having different relative positional relationships between an object to be imaged and a camera that takes an image of the object to be imaged as being associated with the each imaging position;
   a read-out step of specifying an imaging position corresponding to the mage data and reading out the data from the memory; and
   a display step of displaying the read out image data by a display means as an image.

It is preferable that in the method of displaying the image, in the read-out step, the image data corresponding to the specified imaging position and image data corresponding to an imaging position adjacent to the specified imaging position are read out, and in the display step, the image data corresponding to the adjacent imaging position is displayed as the image adjacently to the image corresponding to the specified imaging position. Thereby, when an image in broader range is intended to be obtained by zooming down the image at the specified position, the image at the imaging position adjacent to the specified imaging position is displayed adjacently. In other words, the images can be composed to obtain the image in broader range.

BEST MODE FOR CARRYING OUT THE INVENTION

Figure 1:
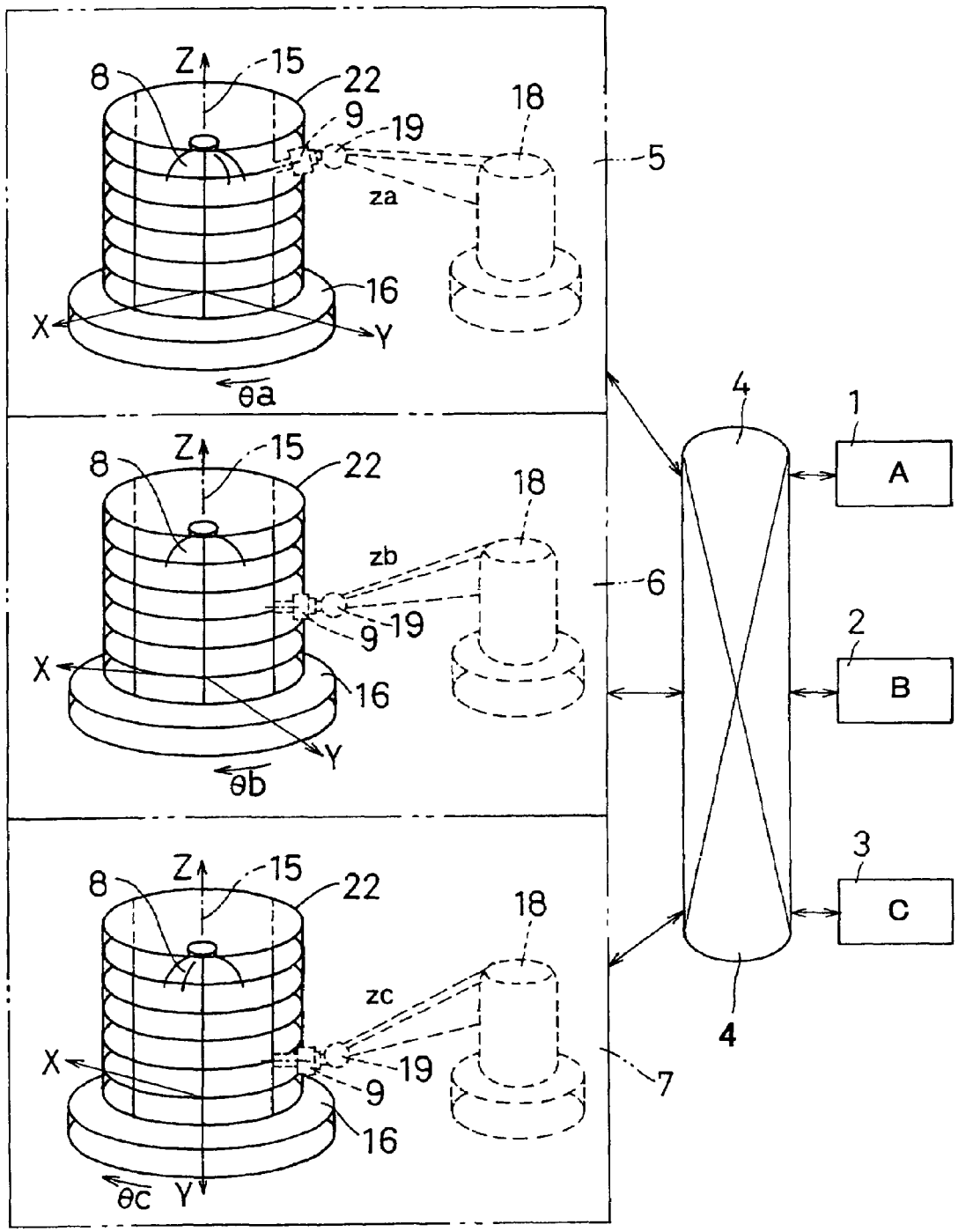
FIG. 1 is a block diagram showing an entire schematic configuration of an embodiment of the present invention.

FIG. 1 is a block diagram showing an entire schematic configuration of an embodiment of the present invention. A plurality of (for example, in this embodiment three) purchasers A, B, C, respectively have processing means 1, 2, 3. The processing means 1, 2, 3 receive images of an outer surface of an article 8 as a commercial product in virtual three-dimensional spaces 5-7 prepared by a seller via a two-way communication network 4 such as a public phone line like a game, and the purchasers A, B, C can observe the article 8 in the processing means 1, 2, 3. The communication network 4 may be, for example, an Internet communication network. In this manner, the plurality of purchasers A, B, C can watch images taken by a camera 9 at imaging positions of the article 8 in desired conditions. In other words, the purchasers A, B, C can simultaneously watch a plurality of images as if they were taking images using the camera 9 installed on a virtual robot 18.

Figure 2:
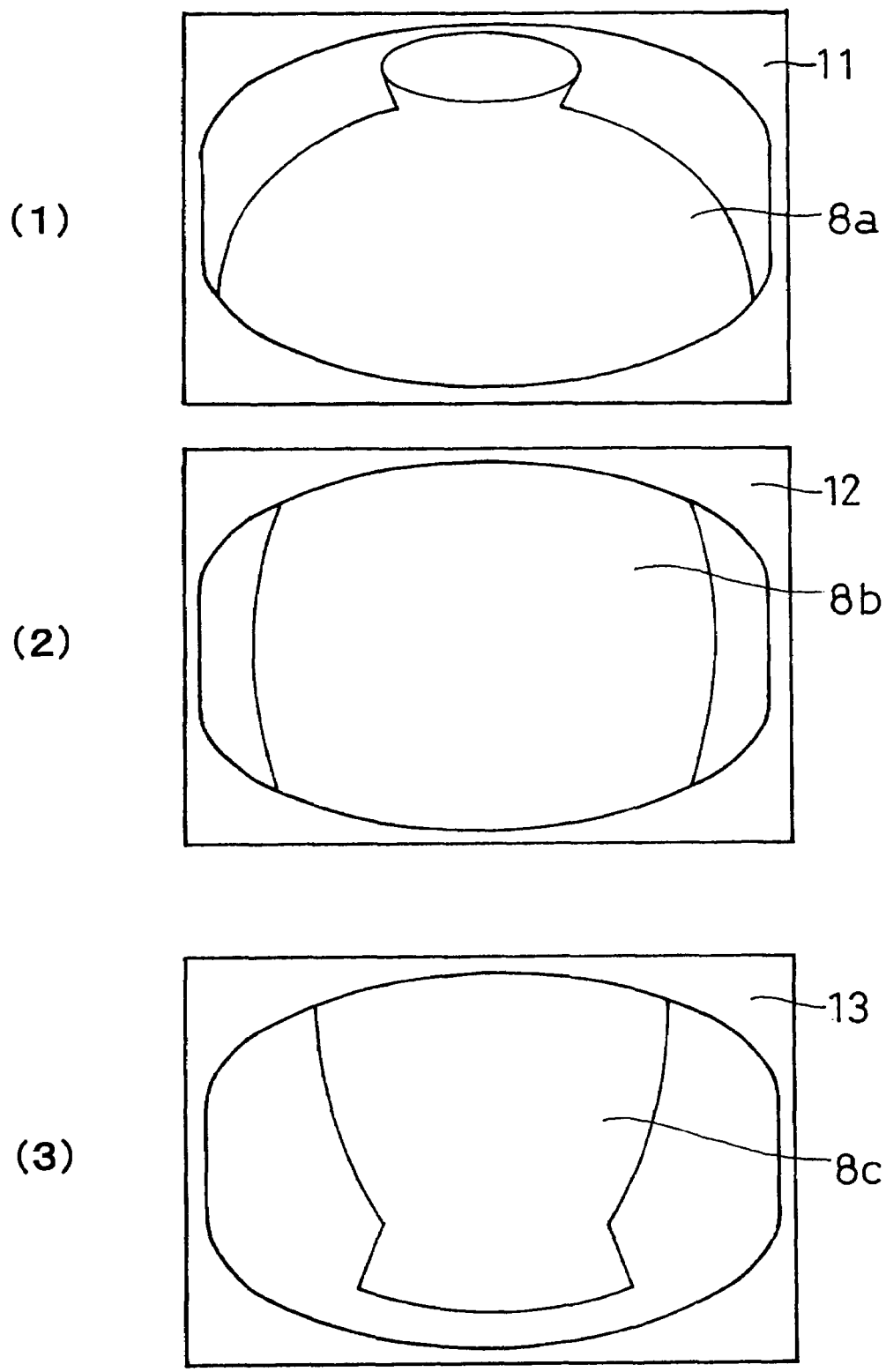
FIG. 2 is a view showing images of an article 8 that purchasers A, B, C are respectively watching through processing means 1, 2, 3.
Figure 3:
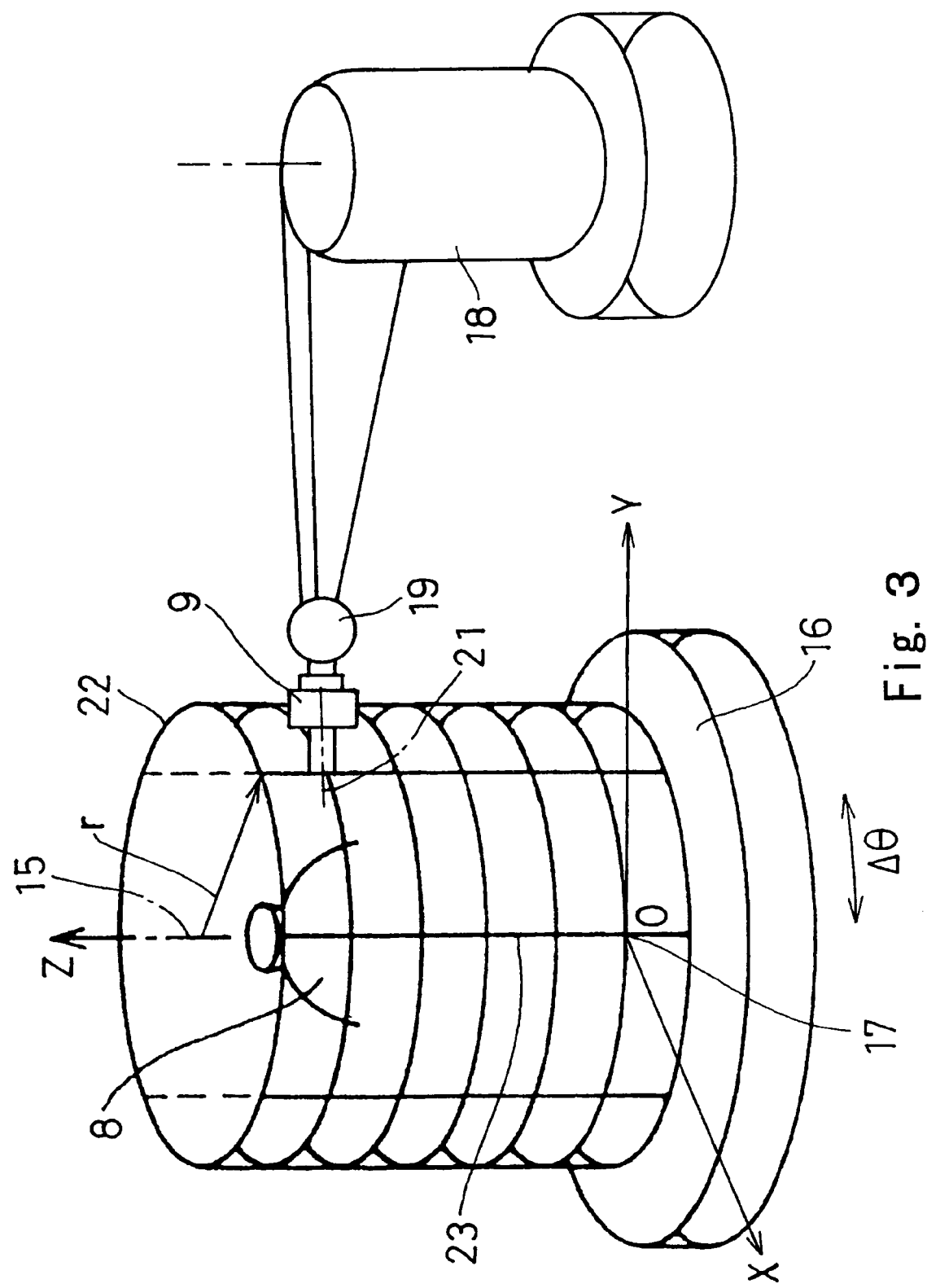
FIG. 3 is a perspective view showing that an image of the article 8 is taken by a camera 9.

FIG. 2 is a view showing images of the article 8 which the purchasers A, B, C are watching through the processing means 1, 2, 3. FIG. 2(1) is a view showing a screen 11 in the processing means 1 of the purchaser A, FIG. 2(2) is a view showing a screen 12 in the processing means 2 of the purchaser B, and FIG. 2(3) is a view showing a screen 13 in the processing means 3 of the purchaser C. Images 8*a*, 8*b*, 8*c* selected by the purchasers A, B, C of the article 8 are displayed on the screens 11, 12, 13 and these images 8*a*, 8*b*, 8*c* are selectively displayed. FIG. 3 is a perspective view showing the state-mode in which the image of the article 8 is taken by the camera 9. The article 8 is placed on a turntable 16 rotatably driven around a vertical rotational axis 15 such that an axis of the article 8 coincides with the rotational axis 15. By assuming that the rotational axis 15 is Z-axis, X-axis and Y-axis orthogonal to each other are set in a virtual plane including a placement plane on the table 16 that is perpendicular to Z-axis, thus setting a rectangular coordinate system in the turntable 16. The placement plane of the turntable 16 is a horizontal plane. An origin 17 in the rectangular coordinate system is present in the placement plane. A rotational angle θ of the turn table 16 around the rotational axis 15 and an axial position z of the camera installed on a wrist 19 of a robot 18 of plural axes placed in the vicinity of the turn table 16, which is along the rotational axis 15, constitute a relative imaging position between the camera that takes an image of the article and the article. Further, a posture of the camera 9 is maintained by the robot 18 so that an optical axis 21 of the camera 9 passes through an observation point 23 of the article 8. In this case, the observation point 23 through which the optical axis 21 of the camera passes may be located on the rotational axis 15 or at a position other than the rotational axis 15. Specifically, for example, the optical axis 21 of the camera 9 is rotated around a vertical line and a horizontal line by the robot 18, thereby allowing the posture of the camera to be selected. By doing so, the optical axis 21 of the camera 9 is determined to pass through a desired position of the article 8. Posture Nv of the camera 9 according to each viewpoint is set for each imaging position. The imaging positions of the images 8a, 8b, 8c of the article 8 shown in FIGS. 2(1)-2(3) and the postures of the camera 9 are shown in Table 1.

TABLE 1

| FIG. 2 | Imaging Position of Camera 9 | | Posture of Camera 9 |
|---|---|---|---|
| | $\theta$ | Z | |
| (1) | $\theta a$ | Za | Middle |
| (2) | $\theta b$ | Zb | Middle |
| (3) | $\theta c$ | Zc | Downward |

The turntable 16 is rotatable around the rotational axis 15 through 360 degrees. The camera 9 has an automatic focus lens system and has a two-dimensional receiving face perpendicular to the optical axis 21 at an image formation position of the lens system. The two-dimensional receiving face may be realized by, for example, CCD (charge coupled device). The robot 18 has, for example, five-or-six axis degrees of freedom. The imaging position of the camera 9 may be present on a virtual cylindrical plane 22 including the rotational angle $\theta$ around the rotational axis 15. The camera 9 is placed on the virtual cylindrical plane 22 and takes images of the entire periphery of the article 8 from above and below while the article 8 is rotated by the turntable 16.

The virtual cylindrical plane 22 has a certain radius from the rotational axis 15. The camera 9 is displaced relatively by the robot 18 for each predetermined spacing $\Delta\theta$ in a plane including the rotational axis 15 on the virtual cylindrical plane 22. In another embodiment of the present invention, when the article 8 is short, the camera 9 may be displaced relatively in a virtual plane including the rotational axis 15 in the form of a virtual spherical plane including the article 8. The position of the camera 9 along the rotational axis 15 can be easily set in such a manner that both end positions of a moving range of the camera 9 are set and the moving range is divided at even intervals.

Figure 4:
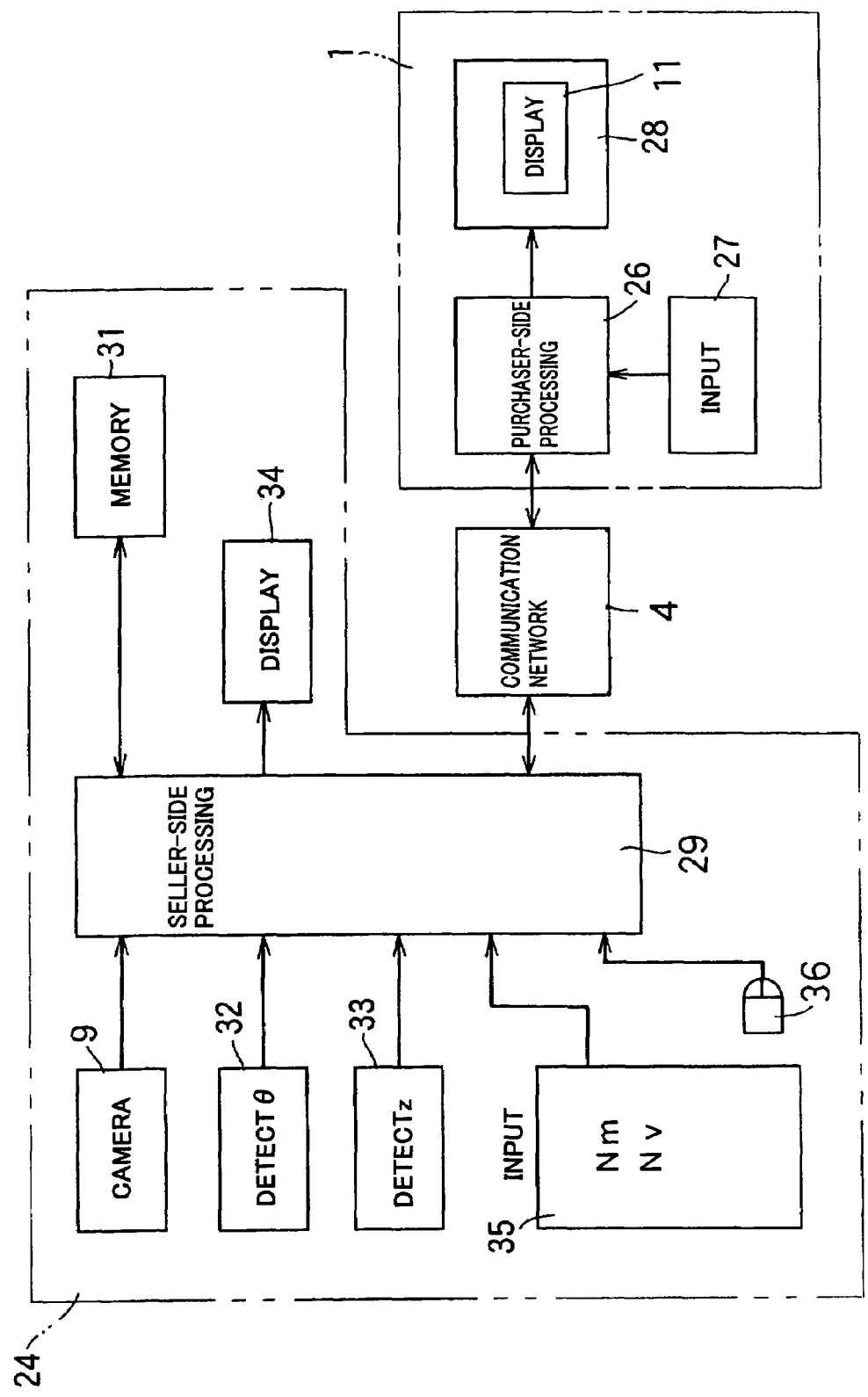
FIG. 4 is a block diagram showing an electric configuration in the embodiment shown in FIGS. 1-3.

FIG. 4 is a block diagram showing an electric configuration in the embodiment shown in FIGS. 1-3. The purchaser A has the processing means 1 which is connected to the processing means 24 owned by the seller via the communication network 4. The processing means 1 of the purchaser A comprises a purchaser-side processing circuit 26 realized by a microcomputer or the like, an input means 27 as a specifying means operated by the purchaser A, and a display means 28 realized by liquid crystal or a cathode ray tube. The processing circuit 26 functions as a transmission/reception means connected to the seller-side processing means 24 and also functions as a control means that reads out image data from a memory 31 mentioned later and causes the display means 28 to display the image data. The display means 28 has the screen 11 shown in FIG. 2 (1). The processing means 2, 3 of the purchasers B, C are configured in the same manner as the processing means 1.

The seller-side processing means 24 comprises a seller-side processing circuit 29 realized by a microcomputer or the like. To the processing circuit 29, the image data obtained by imaging by the camera 9 is given. The processing means 24 comprises a memory 31 for storing the image data of the article 8. The processing circuit 29 functions as a transmission/reception means connected to the purchaser-side processing means 1 and also functions as a memory control means for storing the image data in the memory 31. The rotational angle of the turntable 16 is detected by a rotational angle detecting means 32. The rotational axis direction position z of the camera 9 along the rotational axis 15 is detected by an axial position detecting means 33. Outputs of these detecting means 32, 33 are given to the processing circuit 29. The processing circuit 29 has a display means 34. The processing circuit 29 further has an input means 35 such as a keyboard operated by the seller and a mouse 36 as an input means. The input means 35 is capable of setting a state-mode Nm of a movement of the article 8 and a direction of the optical axis 21 of the camera 9, i.e., the posture Nv of the camera 9. An input means 27 included in the above purchaser-side processing means 1 is configured in the same manner as the input means 35 and comprises a key for setting a magnification K for enlargement or reduction in the screen 11 of the display means 28. The input means 27 may further comprise a mouse similar to the mouse 36 of the processing means 24 and may be adapted to be capable of performing an input operation instruction.

Table 2 shows contents stored in the memory 31.

TABLE 2

| Nm | 0 | | | | | | | 1 | 2 |
|---|---|---|---|---|---|---|---|---|---|
| Nv | | | | | | 1 | 2 | 3 | 4 | 0~4 | 0~4 |
| $\theta$ | 0 | | 1 | 2 | ... | $\theta 1$ | | | | |
| | 0 | | | | | | | | | |
| | 1 | | | | | | | | | |
| | 2 | | | | | | | | | |
| | . | | | | | | | | | |
| z | . | | | | | | | | | |
| | . | | | | | | | | | |
| | z1 | | | | | | | | | |

The image data of the camera 9 is stored in the memory 31 by an operation of the processing circuit 29, in state-mode Nm where each movement mode Nm of the article 8 as a commercial product is in the range of 0-2, under conditions in which each posture Nv of the camera 9 is in the range of 0-4, and under conditions in which each rotational angle $\theta$ of the turn table 16 is in the range of 0 to a maximum value $\theta 1$, and each vertical axial position Z along the rotational axis 15 is in the range of 0 to the maximum value z1. The state-mode of the article 8 refers to, for example, an open state-mode, or a closed state-mode of a door when the article 8 is automobile. For each predetermined rotational angle $\Delta\theta$ of the turn table 16, the camera 9 is moved along the rotational axis 15 by the robot 18, and takes an image of the article 8 for each position in the rotational axis direction, thereby obtaining image data, which is stored in the memory 31.

The purchaser A operates the input means 27 of the processing means 1 to select the position of the camera 9 associated with the image data to be selected.

Figure 5:
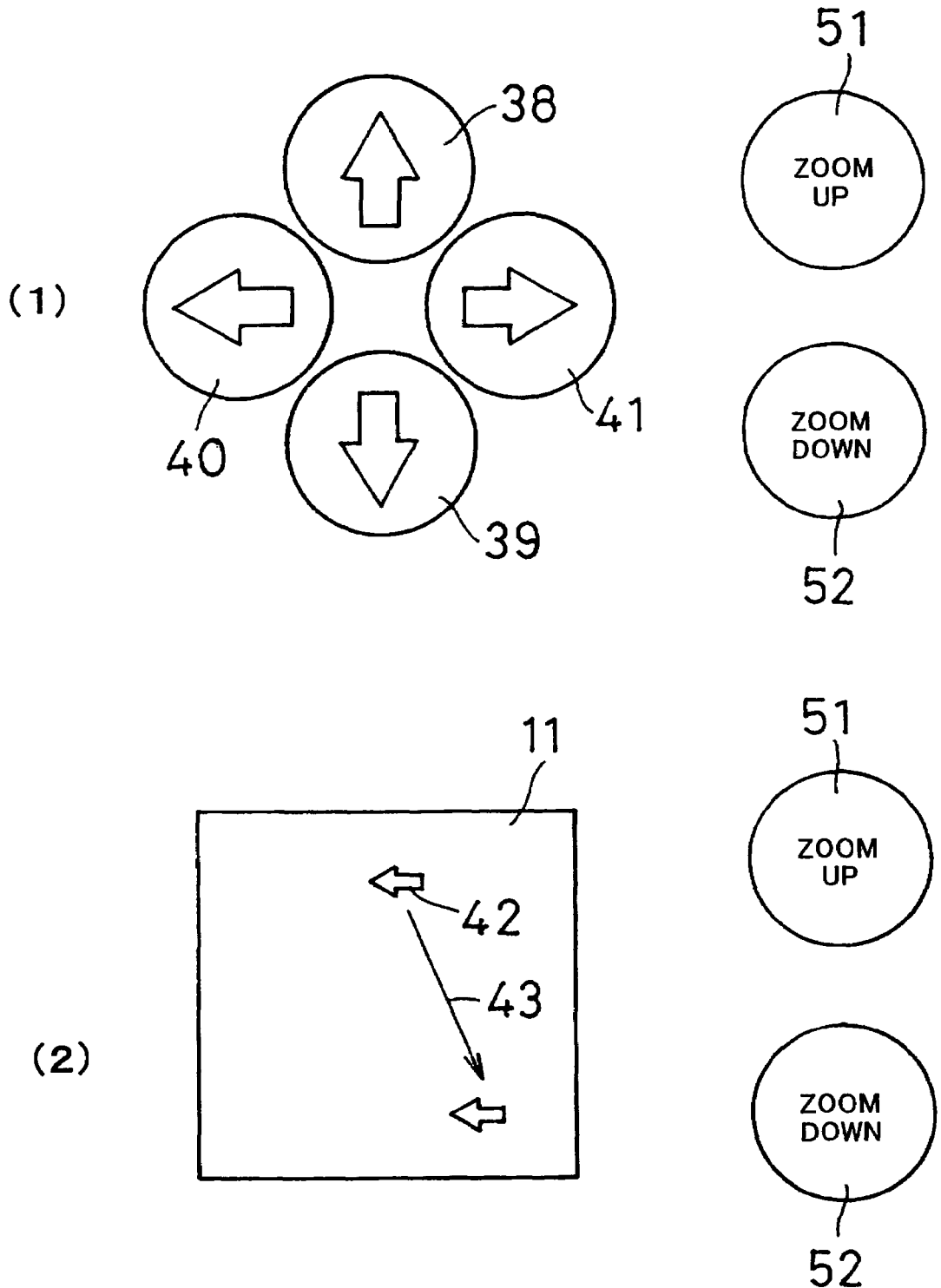
FIG. 5 is a view showing a configuration of part of an input means 27 included in the processing means 1 of the purchaser A.

FIG. 5 is a view showing a configuration of part of the input means 27 included in the processing means 1 of the purchaser A. As shown in FIG. 5(1), push buttons 38-41 are configured by longitudinally and laterally displaying outward arrows. By operating each of the push buttons 38-41, the imaging position is changed into its adjacent position, in each operation of each of the push buttons 38-41 or in proportion to operation time. For example, by operating the push button 38 of the upward arrow, the imaging position of the camera 9 displaced upward in the rotational axis direction can be selected. Also, by operating the button 40 of a leftward arrow, the position obtained by angularly displacing the turntable 16 toward a direction around the rotational axis 15 can be specified. Thus, by operating these push buttons 38-41, a desired imaging position of the camera 9 can be selected.

By operating the mouse provided in the input means 27, a cursor 42 on the screen 11 is clicked (dragged) along, for example, a moving direction 43 as shown in FIG. 5(2). Thus, the positions at which the camera 9 takes still images (moving image) to be displayed by the display means 28, and hence, continuous imaging positions as the positions that the purchaser A sees can be selected. Thus, by continuously and sequentially specifying and selecting adjacent imaging positions by using the mouse, the image of the article 8 seen from each imaging position can be displayed on the screen 11 of the display means 28 by the operation of the processing circuit 26.

In FIG. 5(1) and FIG. 5(2), the input means 27 is further provided with push buttons 51, 52 for zoom up or zoom down which are operated for the purpose of changing a magnification K mentioned later.

Figure 6:
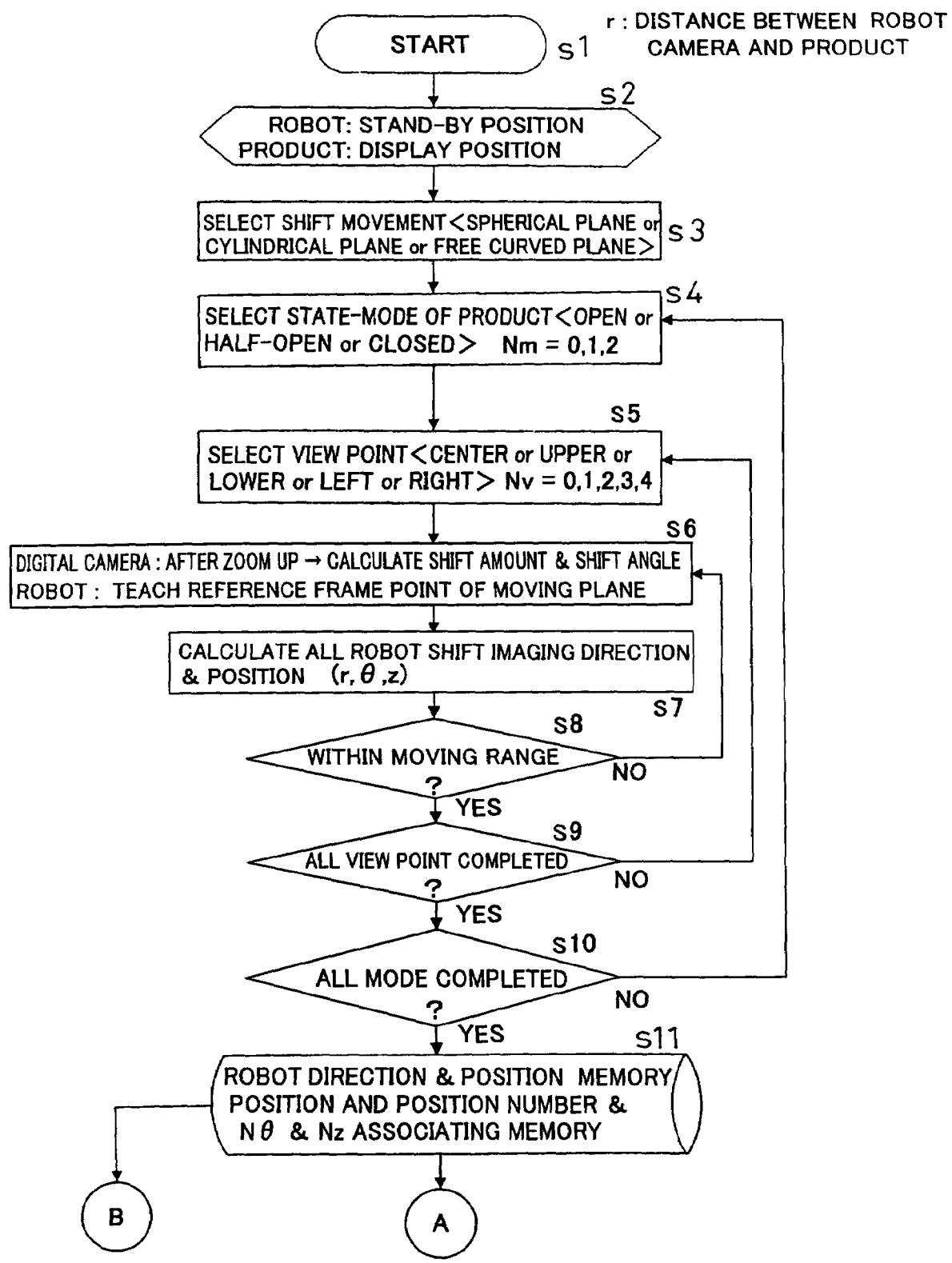
FIG. 6 is a view to explain part of an operation of a processing circuit 29 in a seller-side processing means 24.

FIG. 6 is a view to explain part of an operation of the processing circuit 29 of the seller-side processing means 24. The operation shown in FIG. 6 is executed and the image data obtained by the camera 9 is stored in the memory 31. Processing goes from Step s1 to Step s2, where the robot 18 in FIG. 3 is set at a stand-by position and the article 8 as a commercial product is placed on the turntable 16. A horizontal distance between the camera 9 that takes an image and the rotational axis 15 coincident with the axis of the article 8 is represented by a variable r. In Step s3, a shift movement of the camera 9 along the rotational axis 15 on the cylindrical virtual plane 22 is selected. In another embodiment of the present invention, selection and configuration may be carried out so that the camera 9 is adapted to perform shift displacement movement in the form of the spherical plane as described above or in the form of a desired free curved plane.

In Step s4, the state-mode Nm of the article 8 is selected. For example, when the article 8 is automobile, Nm=0, 1, or 2 is selected according to whether the door is in an open state-mode, a closed state-mode, or a half-open state-mode.

In Step s5, the viewpoint of the camera 9, and hence the posture Nv of the camera 9 as the direction of the optical axis 21 is selected. For example, the view point is such that the posture Nv is determined as 0-4 as corresponding to center, upper, lower, left, and right, among which the posture Nv is selected. In Step s6, after the camera 9 is moved closest to the article 8, a shift length and shift angle are calculated.

Simultaneously, both ends of frame points of the moving range of the camera 9 on the cylindrical plane 22 as the moving plane are taught to the robot 18. In Step s7, the direction of the optical axis 21 as the imaging direction of the camera 9 thus obtained as being associated with the robot 18 and the distance r, the rotational angle θ and the axial position z, are all calculated. In Step s8, it is judged whether or not the calculations obtained in Step s7 are in the moving range of the robot 18, and when it is judged that they are in the moving range, processing goes to Step s9, where it is judged whether or not calculations of all view points as all the postures of the camera 9 are completed. When it is judged that the calculations of all the viewpoints are completed, in Step s10, it is judged whether or not setting of all the state-modes Nm are completed.

When the calculations of the state-modes Nm of the article 8, the postures Nv, and the imaging positions θ and z associated with the camera 9 are completed, in Step s11, store addresses are set in the memory 31 as shown in the above table 2.

Figure 7:
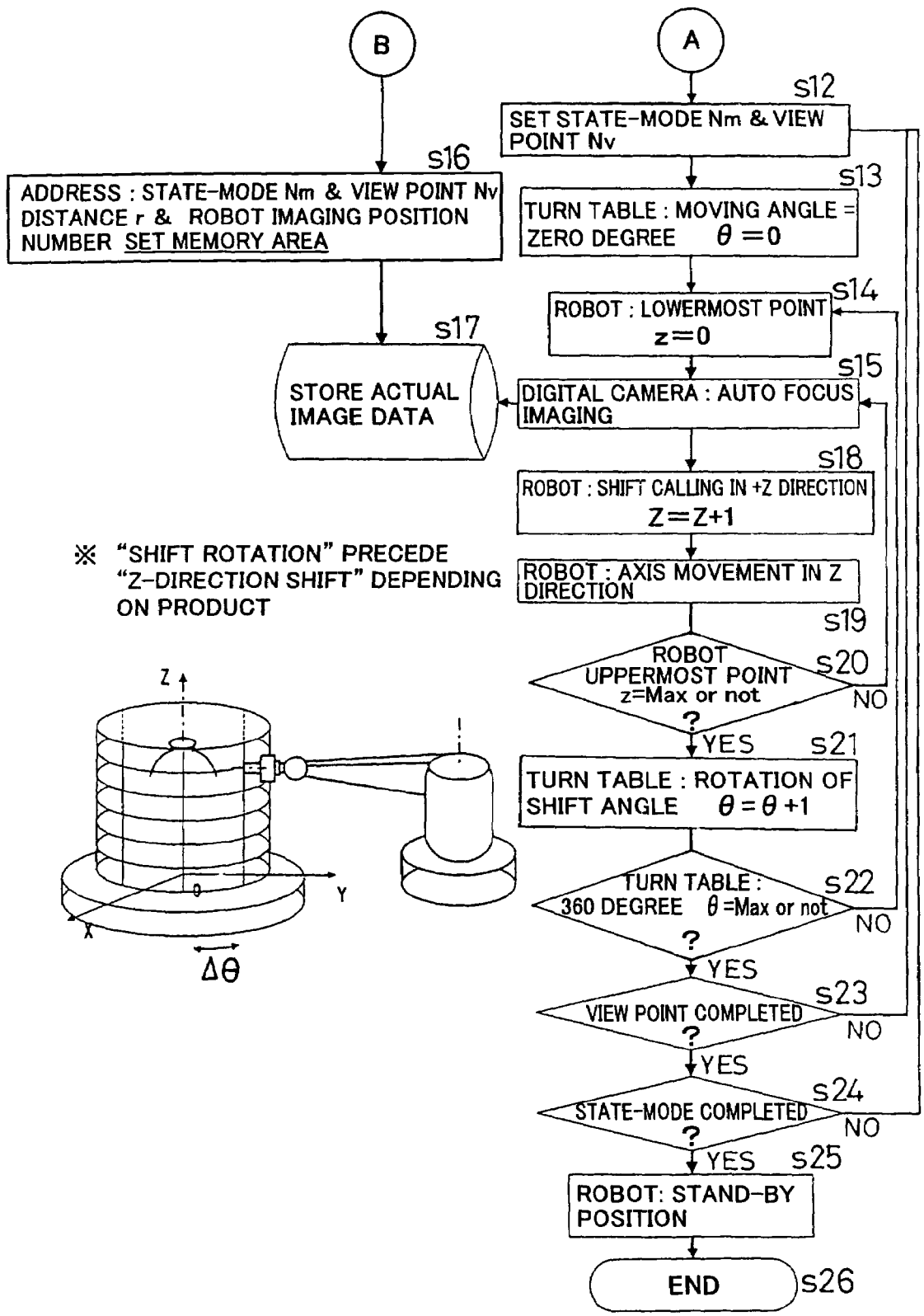
FIG. 7 is a view to explain an operation of the processing circuit 29 included in the seller-side processing means 24, which follows an operation in a Step s11 shown in FIG. 6.

FIG. 7 is a view to explain an operation of the processing circuit 29 included in the seller-side processing means 24, which follows the operation in Step s11 in FIG. 6. In the above-mentioned Step s11, the robot 18 is taught the posture and the axial position z of the camera 9 as corresponding to the rotational angle θ of the turn table 16 for each state-mode Nm.

In Step s12 in FIG. 7, each state-mode Nm and the posture of the camera 9 as the viewpoint are set. In the subsequent Step s13, the movement angle θ of the turn table 16 is initialized to zero. In Step s14, the position z of the camera 9 associated with the robot 18 is set to a lowermost point z=0 In Step s15, the camera 9 takes an image of the article 8 by automatic focus. In Step s16, based on the state-mode Nm, the view point Nv as the posture of the camera 9, the distance r, and imaging position number associated with the robot 18, a store area of the memory 31 is set. In Step s17, in thus set store area, the image data from the camera 9 is stored and recorded. In Step s18, the axial position z of the camera 9 associated with the robot 18 is incremented by 1 (z=z+1), thereby setting the axial position which is closer by predetermined height Δh to the uppermost side. In Step s19, based on thus specified shift calling operation, the wrist 19 of the robot 18 performs operation of each axis of the robot 18 so that the camera 9 is set at the axial position along Z-axis. In Step s20, it is judged whether or not the position z along the rotational axis 15 is the uppermost point z1, and when it is judged the position z is not the uppermost point z1, processing goes back to Step s15. When the camera 9 reaches the uppermost position z1 in the rotational axis direction, in the subsequent Step s21, the rotational angle θ of the turn table 16 is incremented by one (θ=θ+1), and adjacent rotational angle position which is angularly displaced by a predetermined value Δθ is set. In Step s22, it is judged whether or not the turn table 16 is at the maximum angle θ1, for example, 360 degrees, and when it is judged that the turn table 16 is not at the maximum angle θ1, processing goes back to Step s14. When the rotational angle of the turn table 16 is the maximum value θ1, processing goes to Step s23, where it is judged whether or not an imaging operation of the postures Nv as all view points is completed. When it is judged that the imaging operation is completed, processing goes to Step s24, where it is judged whether or not an imaging operation of all the state-modes Nm is completed. When it is judged that the imaging operation is completed, in Step s25, the robot 18 returns to its initial stand-by position. Thus, in Step s26, a series of operations are completed.

Figure 8:
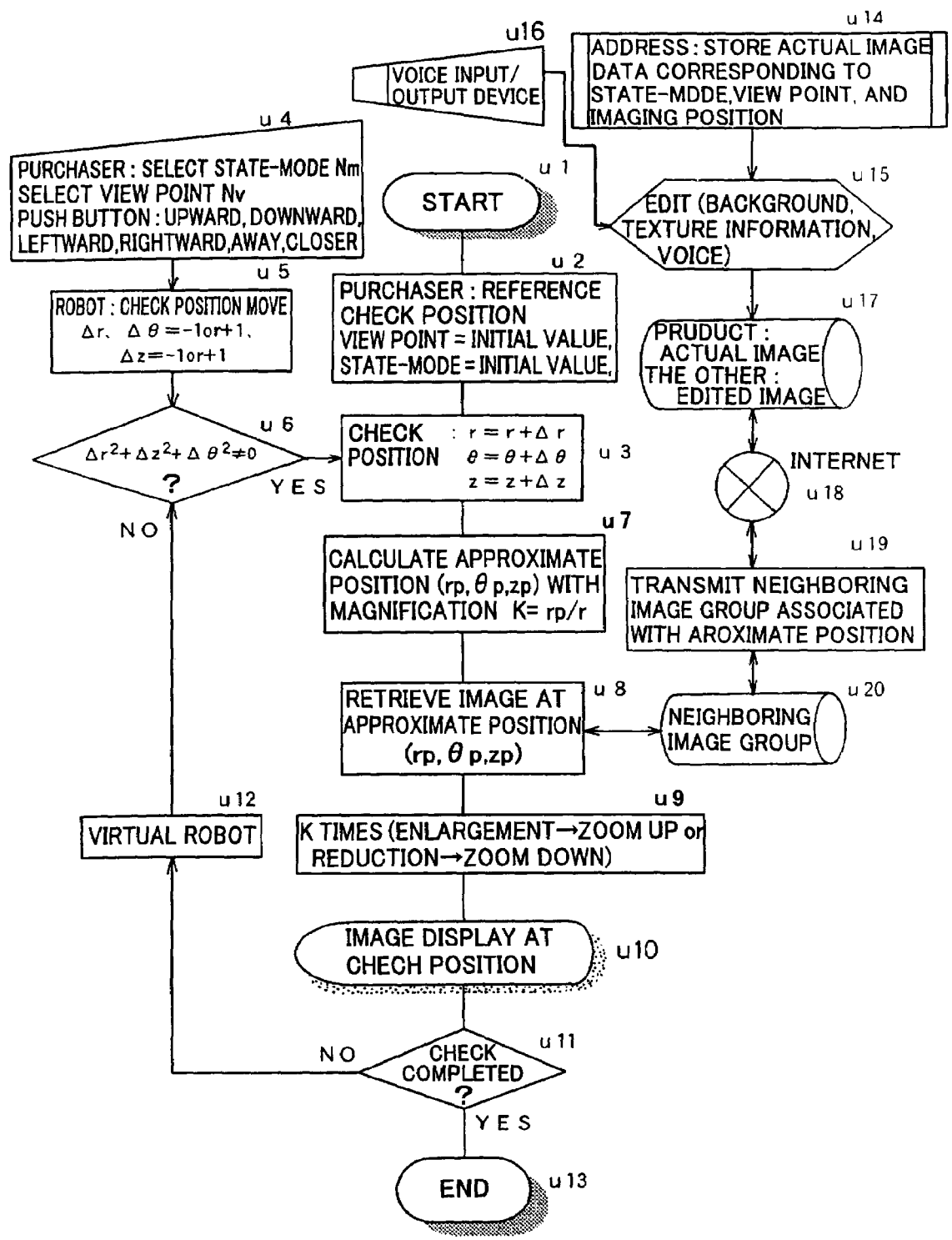
FIG. 8 is a flowchart to explain an operation of a processing circuit 26 included in the processing means 1 of the purchaser A.

FIG. 8 is a flowchart to explain an operation of the processing circuit 26 included in the processing means 1 of the purchaser A. The processing circuit 26 is connected to the processing circuit 29 of the processing means 24 of the seller via the communication network 4 such as Internet, thereby allowing the contents stored in the memory 31 to be read out. The memory 31 may be provided in a server of a provider in Internet communication.

Processing goes from Step u1 to Step u2, where the purchaser A operates the input means 27 to perform an input operation for watching the image of the article 8 by the display means 8. Thereby, an initial value of the imaging position as the reference check position comprised of a combination of the rotational angle position θ and the axial position z associated with the camera 9 is set. Further, an initial value of the posture Nv of the camera 9 as the viewpoint representing the axis 21 of the camera 9 and an initial value of the state-mode Nm of the article 8 are automatically set. Thereby, the purchaser A can watch, for example, the entire image of the article 8 displayed on the screen 11 of the display means 28, and hence, check the article 8. Then, processing goes to a subsequent Step u3.

In Step u4, the purchaser A operates the input means 27 to select the state-mode Nm, and the posture Nv of the camera 9. Further, the purchaser A operates the input means 27 in FIG. 5 to perform an input operation of moving the camera 9 from an initial imaging position in the vertical or horizontal direction and changing the distance r from the rotational axis 15 of the camera 9 for zoom up or zoom down. In Step u5, the distance r, the posture Nv, and the axial position z are sequentially varied by predetermined values, Δr, Δθ, Δz. In Step u6, it is judged whether or not a value $P(=\Delta r^2+\Delta\theta^2+\Delta z^2)$ equal to a sum of squares of respective values Δr, Δθ, Δz is zero. When it is judged the value P is not zero, processing goes to Step u3, where values Δr, Δθ, Δz are added to current values r, θ, z thereby setting an imaging position of the camera 9. In Step u7, a magnification K of zoom up or zoom down by operation of the push button 51 or 52 of the input means 27 is calculated.

$$K=r_p/r \quad (1)$$

where $r_p$ is a horizontal distance from the article to a virtual curved plane onto which the optical axis projects, and the magnification K is a ratio of zoom-up or zoom-down distance r to the reference value rp. So, as corresponding to the magnification K, the rotational angle position $\theta_p$ and the axial position $Z_p$ as approximate imaging position at which the image data prestored in the memory 31 exists, are calculated and the distance rp is calculated (this is obvious because the curved plane is the virtual cylindrical plane 22).

Figure 9:
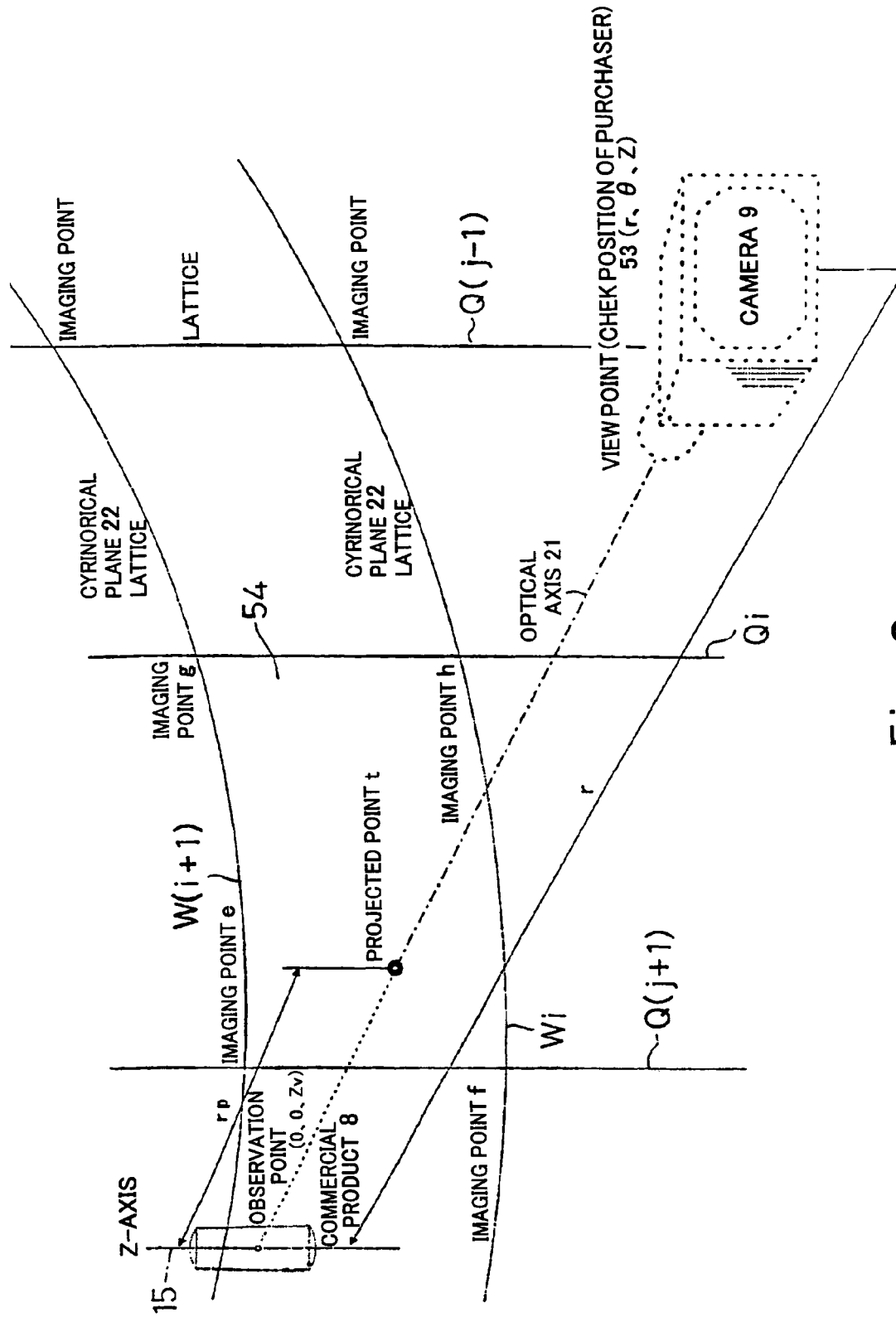
FIG. 9 is a view to explain a principle for conducting retrieval of an image at an approximate position ($r_p$, $\theta_p$, $z_p$) with the processing circuit 26 included in the processing means 1 of the purchaser A side.

In Step u8, retrieval of the image data stored in the memory 31 as corresponding to the combination of the angle position $\theta_p$, the axial position $Z_p$, and the distance rp desired by the purchaser A, which has been obtained in the above Step u7 is conducted as shown in FIG. 9.

In Steps u14-u20 in FIG. 8, part of the operation of the processing circuit 29 included in the processing means 24 of the seller is illustrated. In Step u14, actual image data corresponding to the state-mode of the article 8, the posture of the camera 9 with respect to the view point, and the imaging position comprised of the combination of the rotational angle θ and the axial direction z is stored in the memory 31. In Step u16, further, a voice signal is given by a voice input/output device such as a microphone. The voice signal may be, for example, data that describes how the article 8 is. In Step u15, the image data obtained in Step u14 and the voice data obtained in Step u16 are edited, and a background of the article 8 and texture information and voice associated with the article 8 are combined and stored in the memory 31. In Step u17, the image data of the article 8 as the commercial product and the corresponding information edited in Step u15 are stored in the memory 31. In Step u18, in response to a request signal by the processing means 1 of the purchaser A, the neighboring image data associated with the rotational angle position $\theta_p$, the axial position $z_p$, and the distance r which are specified by the input means 27 are read out from the memory 31 and sent to the processing circuit 26 via the communication network 4 by Internet communication (Step u19). In Step u20, the image data read out from the memory 31 is given to the processing circuit 26, and in the above-mentioned Step u8, retrieval operation by the processing circuit 26 is conducted.

The combination of the rotational angle position $\theta_p$, the axial position $z_p$, and the distance rp in Steps u7, u8, 19 are represented by the approximate position $(r_p, \theta_p, z_p)$.

In Step u9, enlargement and reduction of the image data at the approximate position is calculated based on the magnification K obtained in the Step u7, according to the zoom up and zoom down of the position of the camera 9 with respect to the article 8 by the input means 27. In Step u10, the image data calculated in Step u9 is displayed on the screen 11 of the display means 28. In Step u11, it is judged whether or not the image of the article 8 is displayed on the screen 11 of the display means 28, and if it is not necessary to perform the subsequent display operation, processing goes to Step u13, where a series of operations are completed.

FIG. 9 is a view to explain a principle for retrieving the image at the approximate position $(r_p, \theta_p, z_p)$ with using the processing circuit 26 included in the processing means 1 of the purchaser A side. This retrieval operation is conducted in Step u8 in FIG. 8. A camera position 53 (r, θ, z), i.e., view point of the purchaser is projected onto the virtual cylindrical plane 22 along the optical axis 21, and a projected point t (K×r, θ, K×(z−zv)+zv) on the virtual cylindrical plane 22 is calculated by setting the magnification $K=r_p/r$. zv is a coordinate-value in the Z direction of a point (observation point) where the optical axis 21 crosses the rotational axis 15 on the virtual plane including the rotational axis 15 and the optical axis 21. On the virtual cylindrical plane 22, lines Wi, W(i+1) circumferentially extending as equally spaced in the rotational axis direction 15 are set and lines Q (j−1), Qj, Q(j+1) extending vertically along the rotational axis 15 as spaced at equal angle around the rotational axis 15 are set. Imaging points e, f, g, h as positions where the images are taken by the camera 9 are points where the lines Wi, W (i+1) cross the lines Q (j−1), Qj, Q(j+1). The lines Wi, W (i+1), and the lines Q (j−1), Qj, Q(j+1) form lattice. Based on a calculation of the projected point t, it is judged that the projected point t is located in a region 54 of the virtual cylindrical plane 22 surrounded by the imaging points e, f, g, and h. Subsequently, distances Let, Lft, Lgt, Lht from the projected point t to the imaging positions e, f, g, h in the region 54 where the projected point t is located are calculated. For example, the distance Let represents the distance between the imaging point e and the projected point t.

For example, in this embodiment, when Lft<Let<Lht<Lgt . . . (2), the imaging point f which results in the minimum distance Lft among the four distances in the formula 2 is set as the approximate position $(r_p, \theta_p, z_p)$ at which the purchaser checks. By thus setting the imaging point f as the approximate position, the image data of the imaging point f as the approximate position is obtained by retrieval.

Figure 10:
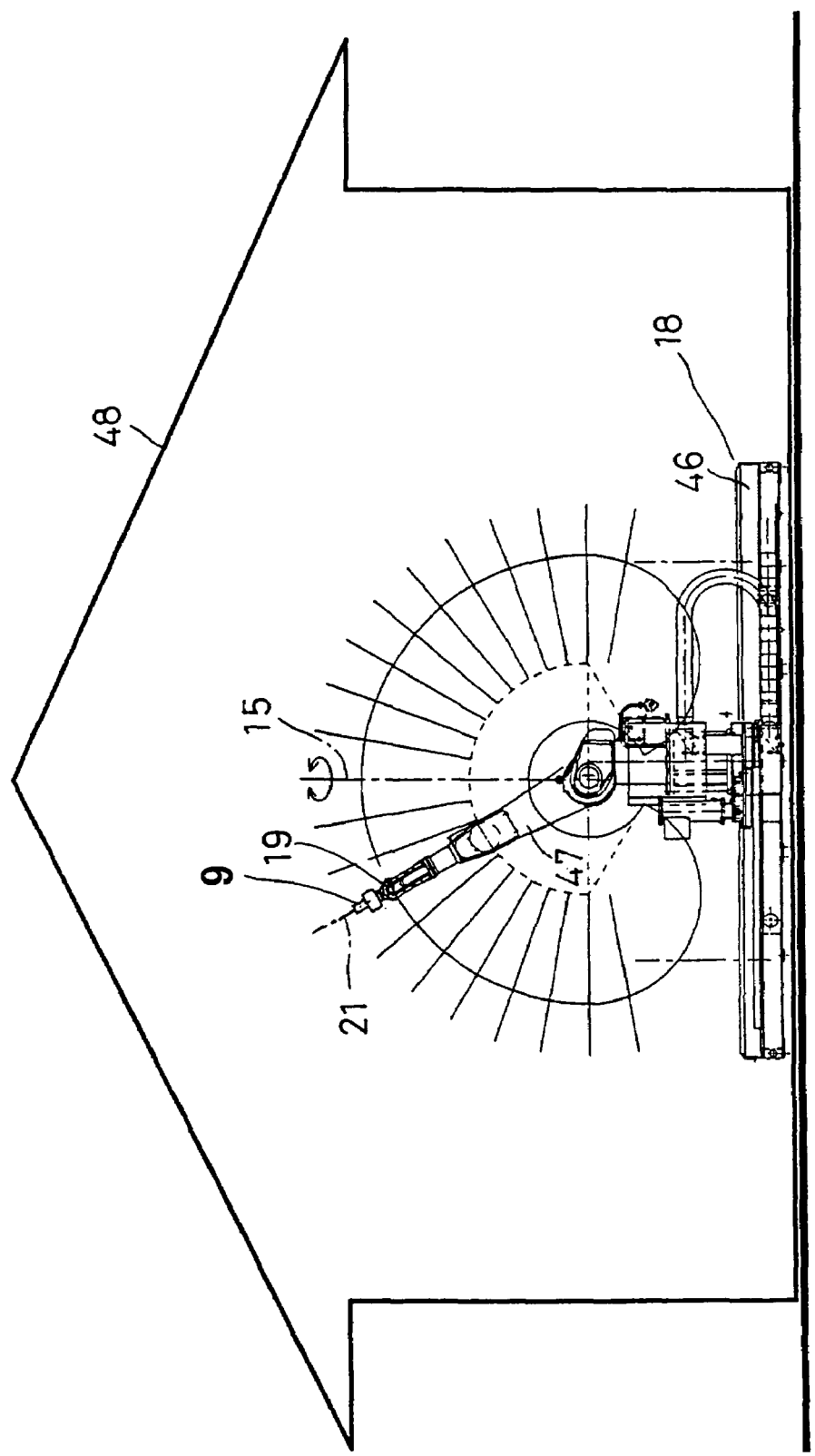
FIG. 10 is a simplified cross-sectional view of another embodiment of the present invention.

FIG. 10 is a simplified cross-sectional view of still another embodiment of the present invention. A robot 18 comprises a traversing means 46 in X-axis and Y-axis directions in a horizontal plane in a rectangular coordinate system having a rotational axis 15 as Z-axis and the X-axis and Y-axis in the horizontal plane, and a robot body 47. The robot body 47 has the rotational axis 15 coincident with the Z-axis. A wrist 19 of the robot body 47 is provided with the camera 9 as described above. The camera 9 is adapted to take an image of an inner surface of an article 48 as a house according to an imaging position, and the image is stored in the aforementioned memory 31. The purchaser A operates the input means 27 of the processing means 1 and watches the image of the inner surface of the article 48 on the screen 11 of the display means 28 at a desired imaging position.

In the above embodiment of the present invention, the image of the article 8 can be visually checked at the position desired by the purchaser A, and the image is an actual image of the article 8, which can be quickly played back and edited as desired. Further, the image can be easily created and constructed by checking through the conventional television receiver, for example, so-called television shopping. Moreover, the actual image data can be easily stored and created. Since the image data is associated with the imaging position of the camera, and hence the position from where the purchaser checks, retrieval can be conducted intuitively. The image data may be still images, or otherwise a moving image of serial still images. In this way, as a virtual robot (robot 18 in FIG. 1), the actual images of the article 8 can be manipulated as if the purchaser were enjoying a game. Further, two-way communication such as Internet communication facilitates selection of the images by the purchaser as well as reception of one-way information from the seller.

In the above embodiment, partial enlargement and reduction of the image makes it possible that the image of the article 8 can be easily zoomed up and zoomed down to be checked. Besides, the camera posture representing the view line 21 can be determined so that the view point of the camera 9 passes through the observation point such as center of gravity of the article 8, thereby facilitating moving operation of the checking point or the like by the purchaser.

In the above embodiment, the still images taken by the camera 9 are addressed based on the imaging points according to coordinates of the article 8, and in addition, the posture of the camera 9 and the state-mode of the article 8 are selected, so that the image data of the article 8 can be freely manipulated and visually checked in retrieval. Thus, the still images can be stored in the memory 31 automatically and systematically. By using the magnification K, retrieval of the image at the approximate position $(r_p, \theta_p, z_p)$ can be conducted. The teaching of several points to the robot 18 enables calculation of the imaging position as the imaging point in the form of curved plane lattice. The camera posture as the camera angle can be also independently calculated based on directional equal division instead of center of gravity of the article 8. The position and posture of the camera that has certain thickness that is normally assumed can be realized by the curved-plane movement by the robot 18 and the turntable 16. The robot 18 may be replaced by reciprocation driving means for reciprocating in the direction parallel to the rotational axis 15 in the plane including the rotational axis 15 coincident with Z-axis to thereby move the camera 9. This simplifies constitution.

The imaging position of the camera 9 can be easily specified by rendering the Z-axis coincident with the rotational axis 15 in the rectangular coordinate system which is fixed to the turntable 16. In another embodiment of the present invention, the moving image may be displayed in such a manner that the still images are refreshed according to a certain moving distance rather than time, thereby continuously performing zoom up and zoom down of the article 8. Further, by using a device for positioning the turn table 16 on which the article 8 is placed and the robot 18 provided with the camera 9, relative movement may be carried out and the camera 9 may automatically take an image of the article 8. Further, as described with reference to FIG. 9, the image of the inner surface of the article 48 of a building such as the house can be taken by the camera 9 and stored in the memory 31 to be distributed via the communication network 4. This makes it possible that the camera 9 is an automatic focus camera which is attached to the wrist 19 of the robot body 47 and thus constituted robot 18 of plural axes directs the optical axis 28 of the camera 9 radially outwardly to take an image, thus obtaining the image data. As a result, the purchaser A can see the image of the inner surface of the article 48 on the screen 11 of the display mans 28 of the processing means 1.

In another embodiment of the present invention, a plurality of cameras 9 may be provided on a fixed basis and the article 8 may be displaced relatively to the camera 9 that is adapted to take an image of the article 8.

Figure 11:
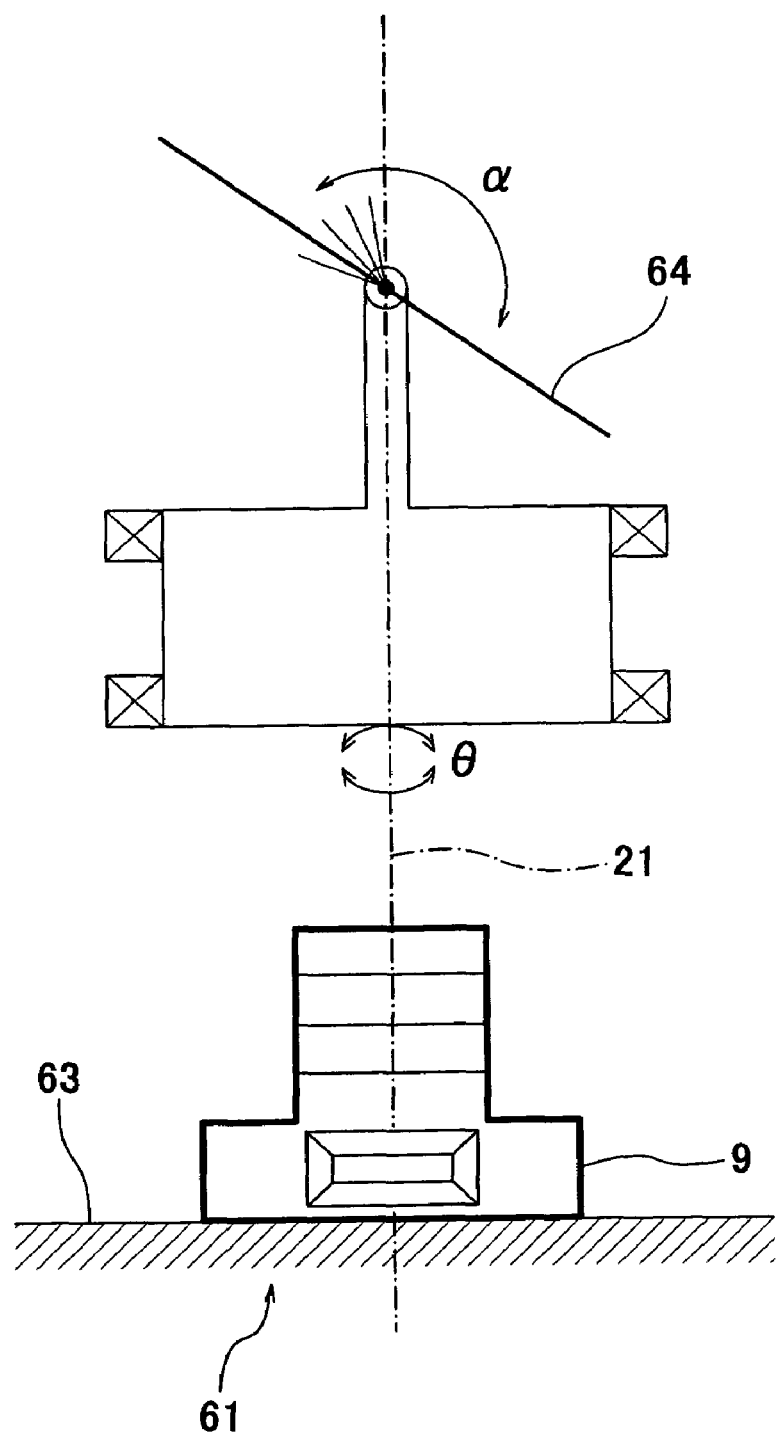
FIG. 11 is a front view showing an example of an imaging means in another embodiment of the present invention.

FIG. 11 shows still another embodiment of the present invention. An imaging means 61 in FIG. 11 is configured such that a camera does not move so as to be close to an article but turns and the like to take images of around it. For example, the camera is adapted to take images of an inner surface of a house or outside scenery. In this respect, the imaging means 61 is similar to a mechanism of the imaging mechanism in FIG. 10. The camera 9 is fixed to a conveying means 63 such as a caravan car and stationary, and a movable reflecting mirror (hereinafter simply referred to as a reflecting mirror) 64 is provided at a position forward of the camera 9. Light reflected on the article is reflected on the reflecting mirror 64 and received by a light-receiving portion of the camera along the optical axis 21 of the camera 9. In this embodiment, the camera 9 is installed such that the optical axis 21 is vertically upward. The reflecting mirror 64 is turnable around the optical axis of the camera 9 and vertically pivotable so that the angle at which a reflecting plane of the reflecting mirror 64 crosses the optical axis 21 of the camera 9 varies. The center of the reflecting mirror 64 crosses the optical axis 21 of the camera 9, which crossing point corresponds to the center of the turn. The reflecting mirror 64 pivots around the horizontal line that passes through the center of the turn. In other words, the horizontal line becomes the rotational axis for pivoting of the reflecting mirror 64. The turn angle of the reflecting mirror 64 is represented by $\theta$ and the elevation angle of the reflecting mirror is represented by $\alpha$. $\theta$ and $\alpha$ specify the posture of the camera 9 with respect to the scenery. The elevation angle $\alpha$ is based on an angle made by a direction of the axis perpendicular to the reflecting plane and a predetermined reference direction at the point where the optical axis 21 of the camera crosses the reflecting plane of the reflecting mirror 64.

In accordance with the imaging means 61, a conveying means 63 enables the imaging means 61 to move to desired places outside. In the selected place, turning, i.e., shift movement in the form of circle of the reflecting mirror 64 makes it possible that the scenery is imaged in a range of 360° around the installation position of the reflecting mirror 64. By combining turning and elevation movement of the reflecting mirror 64, that is, by radial shift operation, the scenery in a range of radial direction (substantially a range of spherical plane) from the reflecting mirror 64 can be imaged. Further, the reflecting mirror 64 may be vertically movable integrally with the camera 9 along the optical axis 21 of the camera 9.

Figure 12:
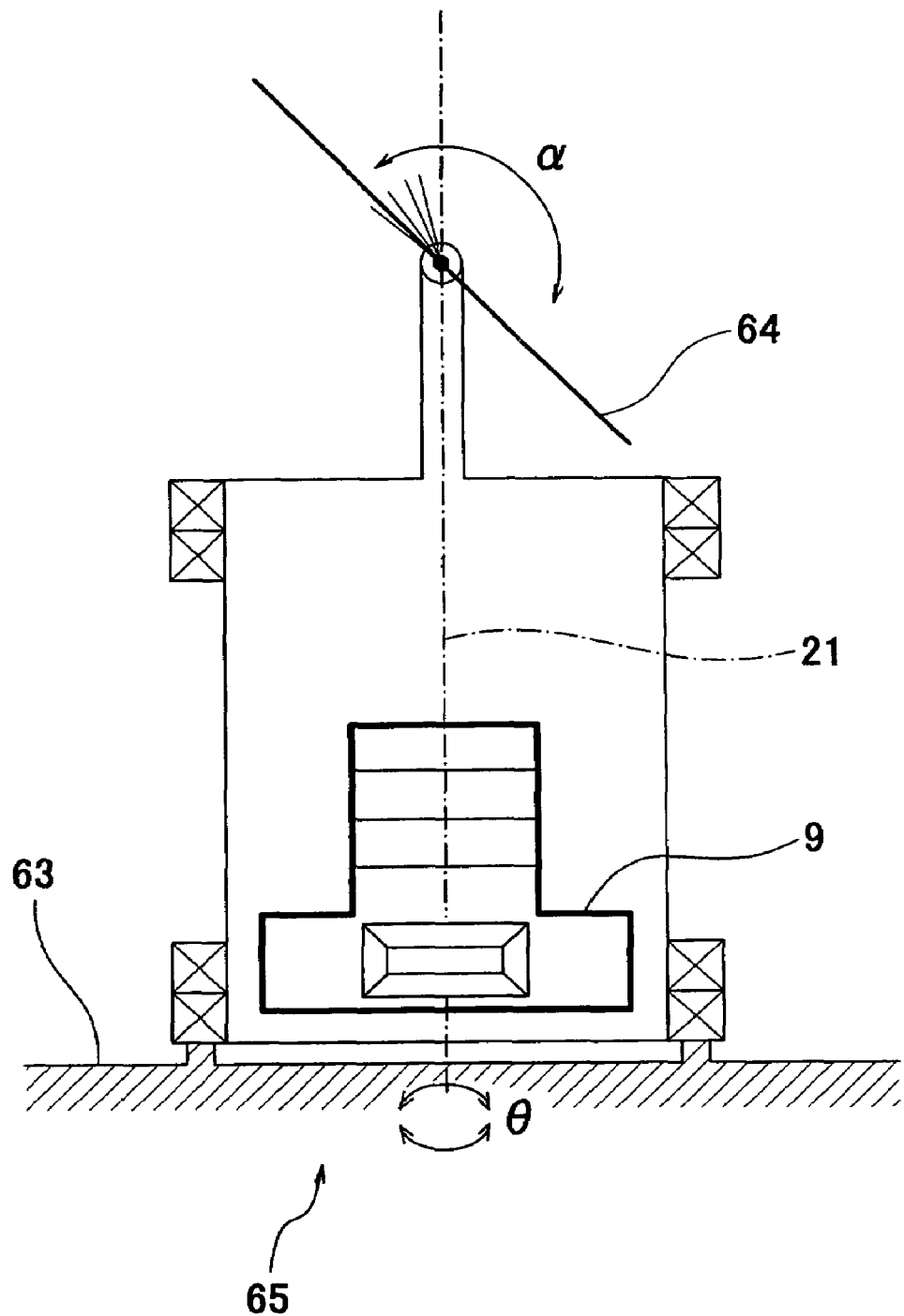
FIG. 12 is a front view showing an example of an imaging means in a further embodiment of the present invention.

In the imaging means 65 in FIG. 12, the camera 9 is turnable integrally with the reflecting mirror 64 around the optical axis of the camera 9. Since the camera 9 turns integrally with the reflecting mirror 64, and therefore, the image of the scenery does not rotate on the light-receiving plane of the camera, it is not necessary to correct the image on the screen. Similarly to the imaging means 61 in FIG. 11, the reflecting mirror 64 is vertically pivotable.

The image taken by the above-identified imaging means 61, 65 is processed by the processing means 1, 24 in FIG. 4. In this case, the detecting means 32, 33 in the processing means 24 may be replaced by detecting means for detecting a turn angle θ and an elevation angle α.

Figure 13:
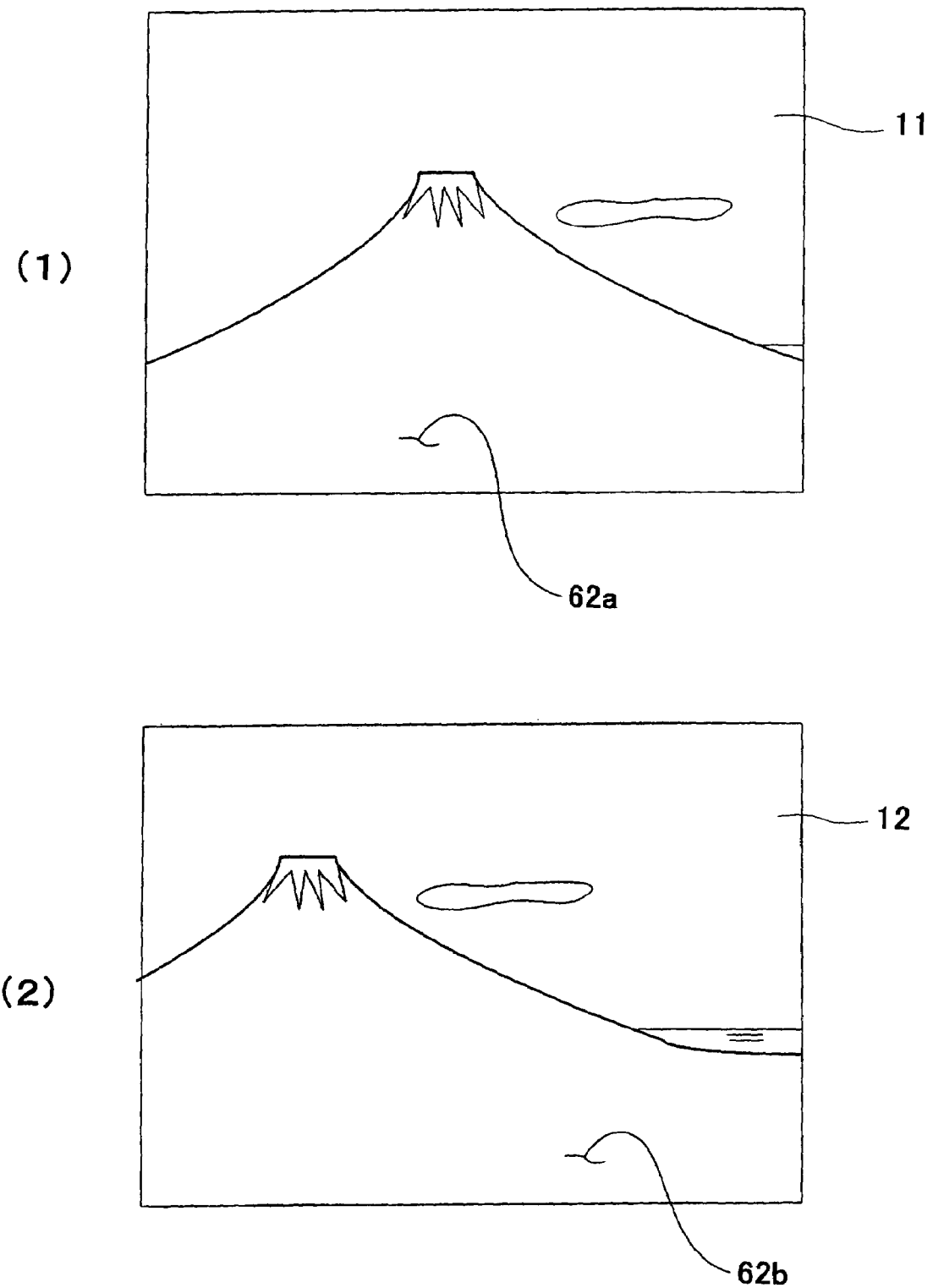
FIGS. 13 (1) and 13(2) are views showing images of scenery which the purchasers are watching through the processing means.

FIG. 13 is a view showing that the users A, B are watching images by the processing means A, B. FIG. 13(1) is a view showing a screen 11 by the processing means 1 of the user A and FIG. 13(2) is a view showing the screen 11 by the processing means 2 of the user B. An image representing a front view of Mt. Fuji (scenery) is displayed on the screen 11, while an image representing a right lower side view of the Mt. Fuji is displayed on the screen 12. On these screens 1, 12, images 62a, 62b respectively selected by the users A, B are displayed, and these images 62a, 62b are selectively displayed. The postures of the reflecting mirror 64 for taking these images 62a, 62b are illustrated in Table 3.

TABLE 3

|  | Posture of Reflecting Mirror 64 | |
|---|---|---|
| FIG. 13 | θ | α |
| (1) | θ a | α a |
| (2) | θ b | α b |

Figure 14:
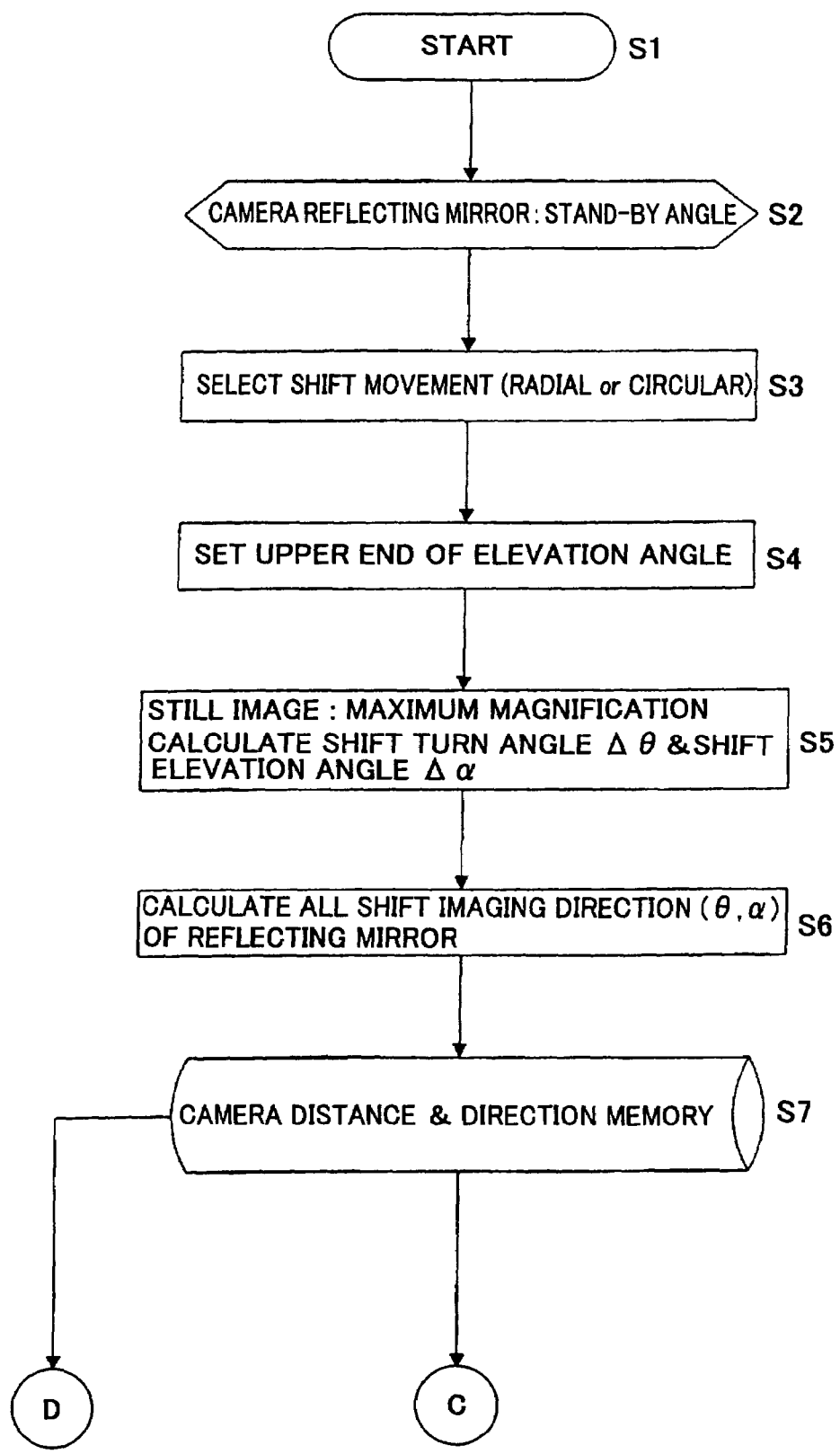
FIG. 14 is a view to explain part of an operation of a processing circuit of the seller-side processing means in the embodiments in FIGS. 11,12.

FIG. 14 is a view to explain part of an operation of the processing circuit 29 of the seller-side processing means 24. Step s1 advances to Step s2, where the reflecting mirror 64 is set at a stand-by position (stand-by angle). The distance between the camera 9 and the scenery is represented by the variable r. In Step s3, radial movement is selected as the shift movement of the reflecting mirror. As described above, circular movement may be selected instead of the radial movement.

In Step s4, the upper end of the elevation angle is selected. The upper end refers to, for example, an angle at which light from above is incident on the light-receiving portion at about 60° with respect to the horizontal plane. In Step s5, the magnification of the camera 9 is set to its maximum, and predetermined shift angles of the reflecting mirror 64, i.e., predetermined shift turn angle Δθ and predetermined shift elevation angle Δα are calculated. The maximum magnification of the camera 9 refers to the state-mode in which the vision field is set to its minimum, i.e., the state-mode in which the camera 9 is rendered closest to the scenery. In Step s6, all the turn angles θ and elevation angles α as the imaging direction of the reflecting mirror 64 which are obtained by this calculation are calculated. In Step s7, as shown in table 3, the store addresses of the memory 31 are set.

Figure 15:
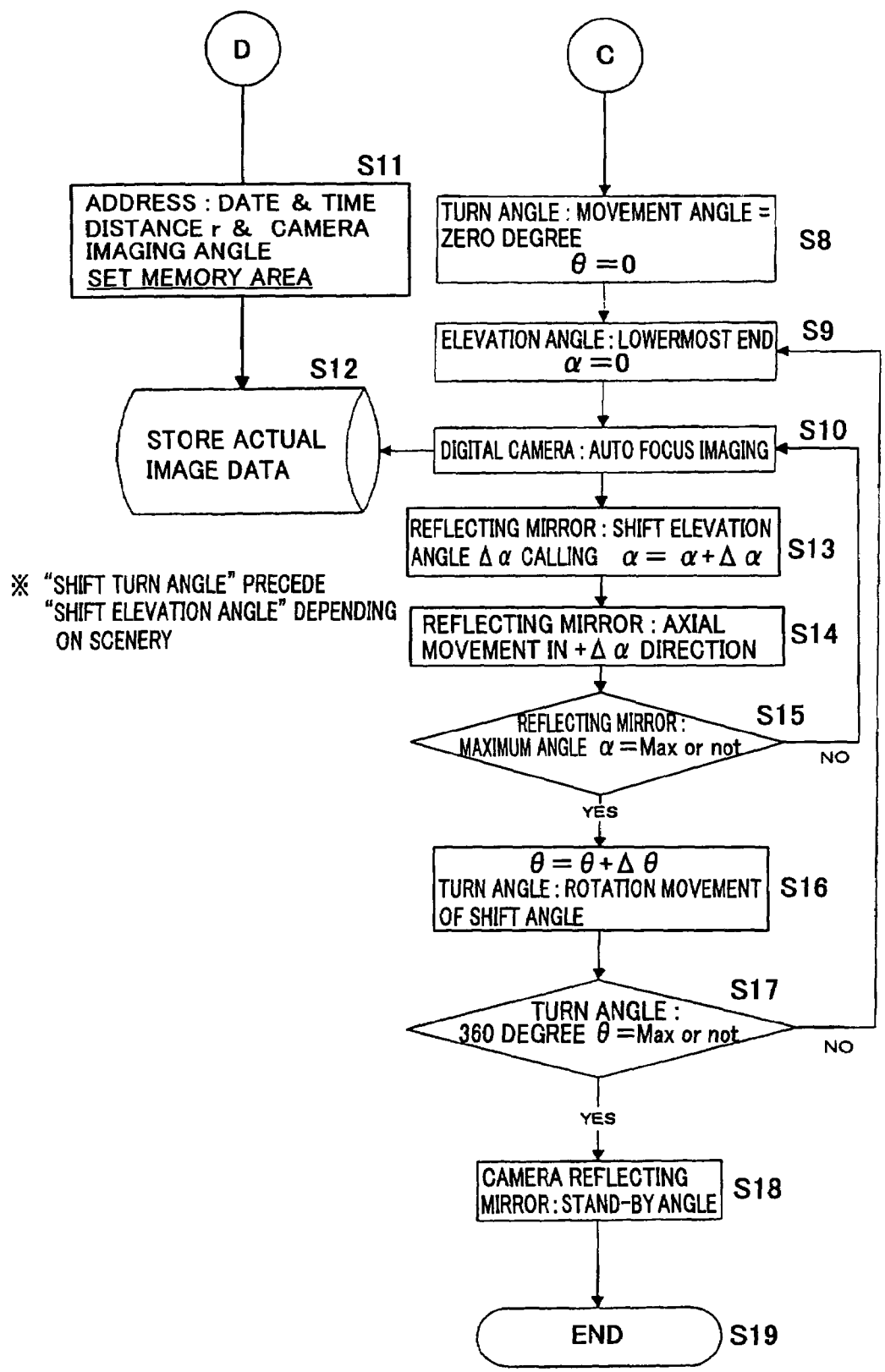
FIG. 15 is a view to explain an operation of the processing circuit included in the seller-side processing means, which follows an operation in Step s7 in FIG. 14.

FIG. 15 is a view to explain an operation of the processing circuit 29 of the purchaser-side processing means 24, which follows the operation in Step s11 in FIG. 14.

In Step s8, the turn angle Δθ of the reflecting mirror 64 is initialized to zero. In Step s9, the elevation angle α of the reflecting mirror 64 is initialized to zero, i.e. the lowermost end of the pivoting movement of the reflecting mirror 64. In Step s10, the camera 9 takes an image of the scenery by automatic focus. The imaged image data is image data obtained when the magnification K is set to its maximum and given the distance $r_p$ when stored in the memory. This prevents degradation of the image when the user enlarges and displays the image.

In Step s11, store area of the memory 31 is set based on date and time when imaging was carried out, a distance from the camera 9 to a focal point and an angle of the reflecting mirror in the imaging. In Step s12, the image data from the camera 9 is stored and recorded in thus set store area.

In Step s13, the elevation angle of the reflecting mirror 64 is incremented by the predetermined shift elevation angle Δα (α=α+Δα) and set according to this direction. In Step s14, based on a shift calling operation thus specified, a pivoting drive mechanism of the reflecting mirror 64 which is not shown pivotally drives the reflecting mirror 64 in the direction of the shift elevation angle Δα. In Step s15, it is judged whether or not the elevation angle Δα is the upper end of the elevation angle, and when it is judged that the elevation angle is not the upper end, processing goes back to Step s10. When the elevation angle Δα reaches the upper end of the elevation angle, processing goes to Step s16.

In Step s16, the turn angle of the reflecting mirror 64 is incremented by the predetermined shift turn angle Δθ (θ=θ+Δθ), and the turn drive mechanism of the reflecting mirror 64 which is not shown turns in the direction of the shift turn angle Δθ. In Step s17, it is judged whether or not the turn angle α after shifting reaches the upper limit of the turn angle, i.e. 360°, and it is judged that the turn angle α does not reach the upper limit, processing goes back to Step s9. When it is judged that the turn angle α reaches 360°, it is judged that the imaging operation in all directions of the reflecting mirror 64 is completed, and processing goes to Step s18. In Step s18, the reflecting mirror 64 returns to its initial stand-by position. Thus, in Step s19, a series of operations are completed.

Figure 16:
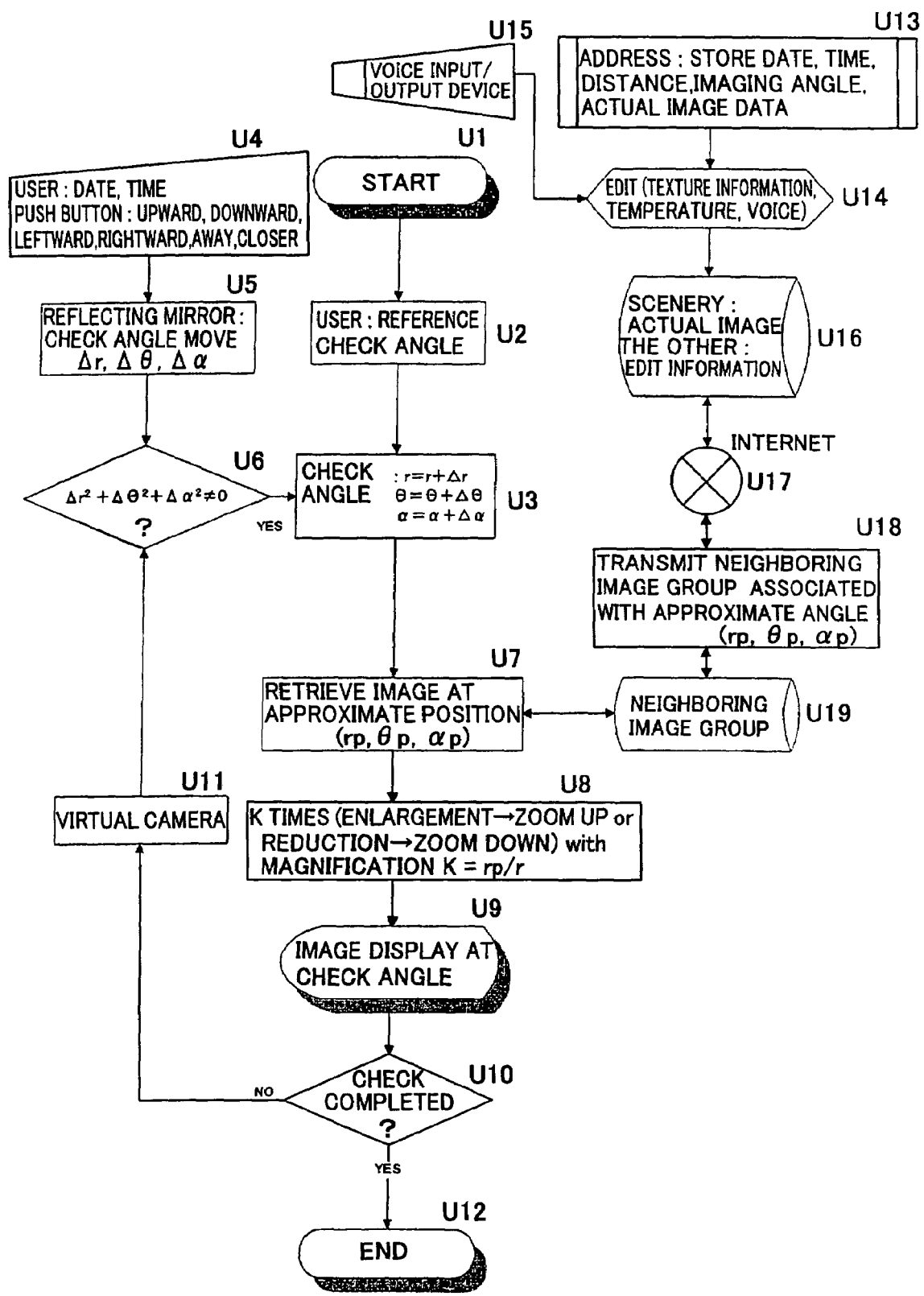
FIG. 16 is a view to explain part of an operation of the processing circuit included in the processing means of the purchaser, in the embodiments in FIGS. 11, 12.

FIG. 16 is a flowchart to explain the operation of the processing circuit 26 included in the processing means 1 of the user A.

Step u1 advances to Step u2, where the user A operates the input means 27 in the same manner as described above to perform the input operation in order to see the image of the scenery by the display means 28. As a result, set is an initial value in the imaging direction as the reference check angle comprised of a combination of the turn angle position θ and the elevation angle position α which are associated with the reflecting mirror 64. The user A sees and checks the image of the scenery displayed on the screen 11 of the display means 28. Then, processing goes to Step u3.

In Step u4, the user A selects date and time when the imaging was carried out by the operation of the input means 27. Further, the user A operates the input means 27 in FIG. 5 to longitudinally and laterally move the reflecting mirror 64 from its initial imaging position and change the distance r from the camera 9 to the focal point, thus performing the input operation for zoom up or zoom down. In Step u5, by the operation in Step u4, the distance r, the turn angle θ, and the elevation angle α are sequentially varied by predetermined values Δr, Δθ, and Δα, respectively.

In Step u6, it is judged whether or not a value $P(=\Delta r^2+\Delta \theta^2+\Delta \alpha^2)$ of the sum of squares of the values Δr, Δθ, Δα is zero. When it is judged that the value P is not zero, processing goes to Step u3. In Step u3, values Δr, Δθ, Δα are added to current values r, θ, α, and the imaging direction of the reflecting mirror 64 is set. Also, the magnification of zoom up or zoom down which is performed by the operation of the input means 27 is calculated.

Figure 17:
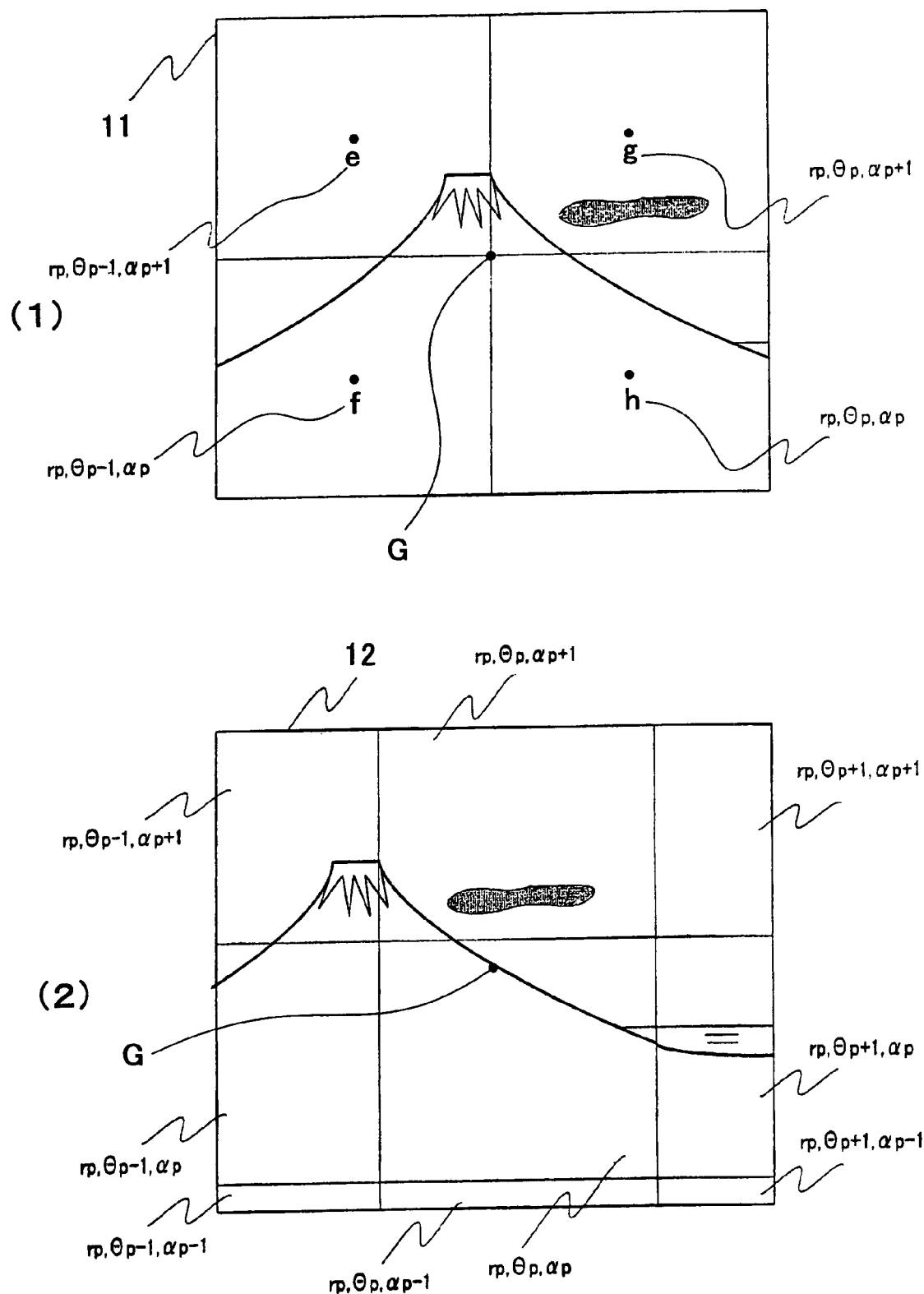
FIG. 17 is a front view showing screens on which images are composed and displayed when a zoom-down operation of an image is performed by the seller-side processing means.

In Step u7, retrieval of the image data as a combination of the turn angle position $θ_p$, the elevation angle position $α_p$, and the distance $r_p$ that are stored in the memory 31 and desired by the user A, is conducted as shown in FIG. 17. Here, the distance rp is the distance from the camera 9 to the focal point (scenery) when the magnification is 1. The above formula (1) is applied and in the formula (1), r represents the distance r in zoom up or zooms down. The magnification K of the zoom up or zoom down by the push button 51 or 52 of the input means 27 is calculated.

In steps u13-u19 in FIG. 16, part of the operation of the processing circuit 29 included in the processing means 24 of the seller is also illustrated.

Step u13 shows the state-mode in which the date and time when the imaging was carried out, and the angle of the reflecting mirror 64 in taking the image, and the corresponding actual image data are stored in the memory 31. In Step u15, a voice signal is given by a voice input/out device by a microphone. The voice signal may be data for explaining place, weather, and climate of the scenery. In Step u14, the image data obtained in Step u13 and the voice data obtained in Step u15 are edited, and texture information, voice, and the like associated with the scenery are combined and stored in the memory 31.

In Step u16, the image data of the scenery and the information edited in Step u15 are stored in the memory 31 as being associated with each other.

In Step u17, a response to a request signal from the processing means 1 of the user A via the communication network 4 is made, and in Step u18, the neighboring image data associated with the turn angle position $\theta_p$, the elevation angle position $\alpha_p$, and the distance rp which are specified by the input means 27 are read out from the memory 31 and sent to the processing circuit 26. In Step u19, the image data read out from the memory 31 is sent to the processing circuit 26, which performs retrieval operation in the above Step u7. The combination of the turn angle position $\theta_p$, the elevation angle position $\alpha_p$, and the distance rp in steps u17, u18 are represented by the approximate position $(r_p, \theta_p, \alpha_p)$.

In Step u8, based on the obtained magnification K, enlargement and reduction of the image data at the approximate position are calculated according to zoom up and zoom down of the camera 9 with respect to the scenery by the input means 27. In Step u9, the image data calculated in Step u8 is displayed on the screen 11 of the display means 28. In Step u10, it is judged whether or not the image of the scenery is displayed on the screen 11 of the display means 28, and when the subsequent display operation is not necessary, processing goes to Step u12, and a series of operations are completed.

Retrieval of the image at the approximate position $(r_p, \theta_p, \alpha_p)$ by the processing circuit 26 of the processing means 1 of the user A is identical to the above explanation made with reference to FIG. 9, and therefore will not be further described. It should be noted that in FIG. 9, the virtual plane where the imaging point t is located is the cylindrical plane including the rotational axis 15 of the article 8 as the center axis, but in this embodiment, the virtual plane is a spherical plane around the camera 9 in which lattice comprised of latitude lines and meridian lines are set. When the shift movement in the form of circle is selected in Step s3 in FIG. 14, a virtual circle is obtained instead of the virtual spherical plane.

FIG. 17 shows that when the image data is displayed on the screen 11 in Step u9 in FIG. 16, with the magnification K less than 1, that is, the zoom-down image is desired, a composite image is displayed. For example, in FIG. 17(1), G represents the observation pint of the user A, and the centers of respective images to be composed are $e(r_p, \theta_p-1, \alpha_p+1)$, $f(r_p, \theta_p-1, \alpha_p)$, $g(r_p, \theta_p, \alpha_p+1)$, $h(r_p, \theta_p, \alpha_p)$. When the user A perform zoom-down operation at the observation point G, the above four images are reduced by K and allocated into the screen 11. Sine there is no blank space in the screen 11, the image display is completed. In FIG. 17(2), likewise, the four images are reduced by K and allocated into the screen 12, but since there is still some blank space left in the screen 12, an image $(r_p, \theta_p+1, \alpha_p+1)$ and an image $(r_p, \theta_p+1, \alpha_p)$ are allocated into the right side of the screen 12, an image $(r_p, \theta_p-1, \alpha_p-1)$ and an image $(r_p, \theta_p, \alpha_p-1)$ are allocated into the lower side of the screen 12, and an image $(r_p, \theta_p+1, \alpha_p-1)$ is allocated into the lower right side of the screen 12. In this manner, the blank space in the screen 12 is perfectly filled and the image display is completed.

INDUSTRIAL APPLICABILITY

In accordance with the present invention, an operator specifies an imaging position of an image of an outer surface or inner surface of an article such as a commercial product, and an image of outside scenery by using a specifying means, thereby obtaining the image of the article from a desired viewpoint. In this way, the operator can observe the article or the like from desired imaging position, and hence desired viewpoint. Therefore, it is advantageous that when the article is a commercial product, a purchaser operates the specifying means and watches the article as serial images of its entire periphery. In addition, the operator can freely select the scenery image, and therefore enjoy virtual trip. The image data of the article or the like is stored in a memory as being associated with each imaging position. Since editing of scenario in the prior art is unnecessary and correction of the image data obtained by the camera is unnecessary, labor is reduced and working time and expense for creating the image data stored in the memory can be significantly reduced.

Since the image of the article or the like is taken by the camera in such a manner than the optical axis of the camera passes through the observation point of the article or the like, the operator can observe the image of the article or the like while watching the desired observation point of the article or the like. This makes it easy that the purchaser observes the commercial product when the article is the commercial product.

The zoom up and zoom down operations of the image of the article or the like can be performed in real time, and therefore, the article or the like can be more easily observed.

The operator can randomly access and select the state-mode of various types of movement of the article, and more easily observe the article.

Since the use of the specifying means can specify the imaging position of the camera at which the image data stored in the memory is created while continuously changing the position into its adjacent position, the operator can observe the image of the article while continuously changing the view point of the operator. This makes it possible that the operator observes the article while continuously moving the view point like actual his/her eye's movement.

The turn table allows the article to rotate around the rotational axis, the camera installed on the wrist of the robot allows the article to be imaged at the position along the rotational axis, and the image data for each imaging position as a combination of a rotational angle and an axial position can be automatically written onto the memory.

The invention claimed is:

1. An image data creating device comprising:
    a camera for taking an image of an object, the camera having an optical axis;
    a turntable for rotating the object to a selected one of a plurality of rotational angles;
    a robot having a plurality of degrees of freedom of movement, the robot supporting the camera and arranged to move the camera into a selected one of a plurality of camera positions with respect to the object, the robot further arranged to adjust the orientation of the camera to one of a plurality of camera orientations so that for each of the plurality of camera positions with respect to the object a corresponding one of the plurality of camera orientations may be defined such that the optical axis passes through an observation point of the object, which observation point is preset in the robot;

a displacement detecting means for detecting a relative displacement between the camera and the object based on the selected camera position, the camera orientation, and the selected rotational angle;

a memory for storing data of the image taken by the camera;

a memory control means for storing the data of the image taken by the camera in the memory as being associated with the relative displacement between the camera and the object when the image was taken; and a transmission/reception means capable of transmitting the data of the image to an external image display device; and wherein the turntable and the robot cooperate with one another to change the relative displacement between the camera and the object, thereby moving the camera into a predetermined plane obtained by calculation, using the observation point as a reference.

2. The image data creating device according to claim 1, wherein the displacement detecting means includes a first displacement detecting means for detecting the selected rotational angle and a second displacement detecting means for detecting an axial position of the camera, and wherein the memory control means is adapted to, in response to outputs of the first displacement detecting means and the second displacement detecting means, define the relative displacement based on a combination of the detected one of the rotational angles of the object and the detected axial position of the camera.

3. The image data creating device according to claim 1, wherein the displacing means is comprised of a movable reflecting mirror provided on an optical axis of the camera, the movable reflecting mirror being adapted to turn around the optical axis of the camera, and reflected light from the object to be imaged is adapted to be reflected on a reflecting plane of the movable reflecting mirror and then be incident on the camera along the optical axis.

4. The image data creating device according to claim 3, wherein the movable reflecting mirror is adapted to pivot around a straight line, which passes through a point where the optical axis of the camera crosses the reflecting plane and is perpendicular to the optical axis of the camera.

5. The image data creating device according to claim 4, comprising a turn angle detecting means and a pivot angle detecting means of the movable reflecting mirror, wherein the memory control means is adapted to, in response to outputs of the turn angle detecting means and the pivot angle detecting means, define the relative positional relationship based on a combination of the detected turn angle and the detected pivot angle.

6. An image display system comprising the image data creating device according to claim 1, and an image display device comprising:

a transmission/reception means capable of receiving the data of the image from the memory, the image data obtained by using the camera to take images of a plurality of imaging states of the object at each of the plurality of positions, and stored as being associated with each imaging position and each imaging state, wherein the imaging states are indicative of a viewing angle and wherein each of the plurality of imaging positions has a different relative a viewing angle and wherein each of the plurality of imaging positions has a different relative displacement between the object and the camera;

a display means;

a specifying means for specifying the imaging position and the imaging state of the object to be imaged;

a control means adapted to, in response to an output of the specifying means, read out at least part of the image data at a predetermined imaging position and imaging state of the object, as an initial set image from the external memory and display the part of the image data by the display means, and then adapted to read out image data corresponding to the imaging position specified in the initial set image by the specifying means from the external memory and display the image data by the display means, and a network connecting the transmission/reception means of the image data creating device and the transmission/reception means of the image display device so as to enable two-way communication.

7. The image data creating device according to claim 1, wherein the calculated predetermined plane is at least one of a virtual cylindrical plane, a virtual spherical plane, and a virtual free curved plane.

8. The device according to claim 1, wherein the observation point is located on a rotational axis of the turntable.

9. The image data creating device according to claim 1, further comprising:

an auditory input device for generating data representative of an auditory signal, wherein the auditory signal is associated with the image, and further wherein the data representative of the auditory signal are stored in the memory as associated with data of the image.

10. The image data creating device according to claim 1; wherein the relative displacement between the camera and the object comprises a position and a posture of the camera in the memory, and wherein the position and posture of the camera are specified by coordinates indicative of a rotational axis direction, a radial direction, and the rotational angle of the turntable.

11. The image data creating device according to claim 1, further comprising:

a text entry device for providing text data, wherein the text data are associated with the image, and further wherein the text data are stored in the memory as associated with the data of the image.

12. An image display device comprising:

a transmission/reception means capable of receiving image data from an external memory, the image data obtained by using a camera to take images of a plurality of imaging states of an object at each of a plurality of imaging positions, and the image data stored as being associated with each imaging position and each imaging state, wherein each imaging state reflects a different physical arrangement of the object, the different physical arrangement effected by a physical manipulation of the object, which manipulation effects a change other than changing the angle of the object with respect to the camera or which manipulation effects a change or in addition to changing the angle of the object with respect to the camera, and wherein each of the plurality of imaging positions has a different relative positional relationship between the object and the camera;

a display means;

a specifying means for specifying the imaging position and the imaging state of the object; and a control means adapted to, in response to an output of the specifying means, read out at least part of the image data at a predetermined imaging position and imaging state of the object, as an initial set image from the external memory and display the part of the image data by the display means, and then adapted to read out image data corresponding to the imaging position and the imaging state of the object specified in the initial set image by the specifying means from the external memory and display the image data by the display means.

13. The image display device according to claim 12, wherein a plurality of pieces of image data stored in the external memory are obtained by taking images while keeping a position of the camera in such a manner that an optical axis of the camera passes through a predetermined portion of the object at the respective imaging positions of the camera.

14. The image display device according to claim 12, wherein
the specifying means is adapted to specify a zoom up/zoom down position which is close to/or away from the object as the imaging position of the camera, and
the control means is adapted to enlarge/reduce the image data in the external memory with a magnification corresponding to the zoom up/zoom down position and display the image data by the display means.

15. The image display device according to claim 12, wherein the specifying means is adapted to continuously specify adjacent imaging positions.

16. The image display device according to claim 12, wherein the transmission/reception means is further capable of receiving auditory data associated with predetermined image data received by the transmission/reception means, and further wherein the auditory data are stored in the memory as associated with the predetermined image data.

17. The image display device according to claim 16, further comprising audio reproduction means for producing an audio signal in response to the auditory data and wherein the control means causes the display means to display the image data and the audio reproduction means to produce the audio signal associated with the image data.

18. The image display device according to claim 12, wherein the transmission/reception means is further capable of receiving text data associated with predetermined image data received by the transmission/reception means, and further wherein the text data are stored in the memory as associated with the predetermined image data.

19. The image display device according to claim 18, wherein the control means causes the display means to display the image data and the text data associated with the image data.

20. A method of displaying an image comprising:
a store step in which image data, obtained by using a camera to take images of a plurality of imaging states of an object at each of a plurality of imaging positions, is stored as being associated with each imaging position and each imaging state, wherein each imaging state reflects a different physical arrangement of the object, the different physical arrangement effected by a physical manipulation of the object, which manipulation effects a change other than changing the angle of the object with respect to the camera or which manipulation effects a change or in addition to changing the angle of the object with respect to the camera, and wherein each of the plurality of imaging positions has a different relative positional relationship between the object and the camera;
a first read-out step of reading out at least a part of the image data as initial set image data from the memory;
a first display step of displaying the read out initial set image data by a display means as an initial set image;
a second read-out step of specifying an imaging position and an imaging state of the object in the initial set image and reading out second image data from an external memory; and
a second display set of displaying the read out second image data as an image in a display means.

21. The method of displaying an image according to claim 20, wherein in the second read-out step, the image data corresponding to the specified imaging position and the imaging state of the object to be imaged and image data corresponding to an imaging position adjacent to the specified imaging position are read out, and in the display step, the image data corresponding to the adjacent imaging position is displayed as the image adjacently to the image corresponding to the specified imaging position.

22. An image data creating device comprising:
a camera for taking an image of an object, the camera having an optical axis;
a displacing means for changing a relative displacement between the camera and the object, the displacing means including:
a turntable for rotating the object around a predetermined rotational axis to a selected one of a plurality of rotational angles; and
a robot supporting the camera and having a plurality of degrees of freedom of movement, the robot operable to shift the camera into a selected one of a plurality of camera positions with respect to the object, and further operable to move the optical axis of the camera to a selected one of a plurality of optical axis angles with respect to the object so that a camera angle with respect to the robot is defined for the selected camera position and the selected optical axis angle such that the optical axis passes through an observation point of the object, which observation point is preset in the robot;
a displacement detecting means for detecting the relative displacement between the camera and the object, the displacement detecting means including:
a rotational angle detecting means for detecting the selected rotational angle of the turntable; and
an axial position detecting means for detecting an axial position of the camera;
a memory for storing data of the image taken by the camera;
a memory control means for storing the data of the image taken by the camera in the memory as being associated with the relative displacement between the camera and the object when the image was taken; and
a transmission/reception means capable of transmitting the data of the image to an external image display device; and
wherein the memory control means defines the relative displacement based on a combination of the detected rotational angle of the object and the detected axial position of the camera in response to outputs of the rotational angle detecting means and the axial position detecting means.

23. An image display system comprising the image data creating device according to claim 22; and
an image display device comprising:
a transmission/reception means capable of receiving image data from the external memory, the image data obtained by using the camera to take images of a plurality of imaging states of an object at each of a plurality of imaging positions, and stored as being associated with each imaging position and each imaging state, wherein the imaging states are indicative of a viewing angle and wherein each of the plurality of imaging positions has a different relative a viewing angle and wherein each of the plurality of imaging positions has a different relative relative displacement between the object and the camera;

a display means;

a specifying means for specifying the imaging position and the imaging state of the object;

a control means adapted to, in response to an output of the specifying means, read out at least part of the image data at a predetermined imaging position and imaging state of the object, as an initial set image from the external memory and display the part of the image data by the display means, and then adapted to read out image data corresponding to the imaging position and the imaging state of object specified in the initial set image by the specifying means from the external memory and display the image data by the display means; and a network connecting the transmission/reception means of the image data creating device and the transmission/reception means of the image display device so as to enable two-way communication.

24. The image display system according to claim 23, wherein a plurality of pieces of image data stored in the external memory are obtained by taking images while keeping a posture of the camera such that an optical axis of the camera passes through a predetermined portion of the object at the respective imaging positions of the camera.

25. The image display system according to claim 23, wherein the specifying means is adapted to specify a zoom up/zoom down position which is close to/or away from the object as the imaging position of the camera, and the control means is adapted to enlarge/reduce the image data in the external memory with a magnification corresponding to the zoom up/zoom down position and display the image data by the display means.

26. The image display system according to claim 23, wherein the specifying means is adapted to continuously specify adjacent imaging positions.

27. The image display system according to claim 23, wherein the first displacing means is comprised of a turntable for rotating the object to be imaged around a predetermined rotational axis, the second displacing means is comprised of a robot of plural axes for displacing the camera along the rotational axis, the first displacement detecting means is comprised of a rotational angle detecting means for detecting a rotational angle of the turn table, and the second displacement detecting means is comprised of an axial position detecting means for detecting the axial position of the camera.

28. The image display system according to claim 23, wherein the displacing means is comprised of a movable reflecting mirror provided on an optical axis of the camera, the movable reflecting mirror being adapted to turn around the optical axis of the camera, and reflected light from the object to be imaged is adapted to be reflected on a reflecting plane of the movable reflecting mirror and then be incident on the camera along the optical axis.

29. The image display system according to claim 28, wherein the movable reflecting mirror is adapted to pivot around a straight line, which passes through a point where the optical axis of the camera crosses the reflecting plane and is perpendicular to the optical axis of the camera.

30. The image display system according to claim 29, comprising a turn angle detecting means and a pivot angle detecting means of the movable reflecting mirror, wherein the memory control means is adapted to, in response to outputs of the turn angle detecting means and the pivot angle detecting means, define the relative positional relationship based on a combination of the detected turn angle and the detected pivot angle.

31. A device for taking images of an object from a plurality of angles, the device comprising:

a camera for capturing one or more images of the object, the camera having an optical axis;

a turntable for rotating the object;

a robot supporting the camera, the robot arranged to move about at least two axes and further arranged to shift the camera into a selected one of a plurality of positions with respect to the object while maintaining an angle of the optical axis with respect to the object such that the optical axis passes through an observation point of the object, the robot cooperating with the turntable to achieve a desired positional relationship between the camera and the object and the robot having the observation point of the object pre-programmed as being associated with each positional relationship between the camera and the object;

first detection means for detecting a rotational angle of the turntable;

second detection means for detecting the selected position of the camera;

control means for determining, in response to the first and second detection means, the positional relationship at the time each of the one or more images is captured based on the rotational angle of the turntable and the selected position of the camera and relative to the observation point, the control means using the observation point as a reference to calculate a rotational angle of the turntable and a position of the camera to achieve the desired positional relationship between the camera and the object such that the optical axis of the camera passes through the observation point;

a memory for storing the one or more images captured by the camera, each image having associated with it in the memory data indicative of the positional relationship between the camera and the object when the image was captured; and transmission means for transmitting one or more images captured by the camera to an external image display device.

32. The device according to claim 31, wherein the observation point is located on a rotational axis of the turntable.

* * * * *